(12) United States Patent
Ponce de Leon

(10) Patent No.: US 11,017,335 B1
(45) Date of Patent: May 25, 2021

(54) GRAPHICAL SCHEDULE RISK ANALYZER

(71) Applicant: Gui Ponce de Leon, Ann Arbor, MI (US)

(72) Inventor: Gui Ponce de Leon, Ann Arbor, MI (US)

(73) Assignee: PMA TECHNOLOGIES, LLC, Ann Arbor, MI (US)

( * ) Notice: Subject to any disclaimer, the term of this patent is extended or adjusted under 35 U.S.C. 154(b) by 1052 days.

(21) Appl. No.: 13/785,853

(22) Filed: Mar. 5, 2013

(51) Int. Cl.
*G06Q 10/06* (2012.01)

(52) U.S. Cl.
CPC . *G06Q 10/063116* (2013.01); *G06Q 10/0635* (2013.01); *G06Q 10/06312* (2013.01)

(58) Field of Classification Search
CPC ......... G06Q 10/0635; G06Q 10/06312; G06Q 10/063116
USPC ...................................................... 705/7.22
See application file for complete search history.

(56) References Cited

U.S. PATENT DOCUMENTS

| | | | |
|---|---|---|---|
| 4,700,318 A * | 10/1987 | Ockman | G06Q 10/06 345/595 |
| 5,016,170 A | 5/1991 | Pollalis et al. | |
| 5,537,524 A | 7/1996 | Aprile | |
| 8,249,906 B2 | 8/2012 | Ponce de Leon | |
| 8,400,467 B1 | 3/2013 | Ponce de Leon | |
| 2003/0014204 A1* | 1/2003 | Heslop | G06Q 10/06 702/84 |
| 2006/0044307 A1* | 3/2006 | Song | G06Q 10/06398 345/419 |
| 2006/0069540 A1 | 3/2006 | Krutz | |
| 2006/0242419 A1 | 12/2006 | Gaffey et al. | |
| 2006/0277487 A1* | 12/2006 | Poulsen | G06Q 10/06 715/772 |
| 2007/0162316 A1* | 7/2007 | Kratschmer | G06Q 10/06312 705/7.22 |
| 2008/0082389 A1* | 4/2008 | Gura | G06Q 10/06 705/7.13 |
| 2008/0126945 A1 | 5/2008 | Munkvold et al. | |

(Continued)

OTHER PUBLICATIONS

Pertmaster Project Risk Software Specification Sheet. Pub. Date: Dec. 4, 2003. Retrieved from http://web.archive.org/web/20031204133829/http://pertmaster.com/docs/PertmasterSpecSheet.pdf. 2 pgs.*

(Continued)

*Primary Examiner* — Timothy Padot
(74) *Attorney, Agent, or Firm* — Carlson, Gaskey & Olds, P.C.

(57) ABSTRACT

A computer-implemented simulation method for analyzing schedule risk in a graphical schedule that includes (a) providing a base schedule that has graphical schedule objects including activities that are connected in a logic network by logic ties, the schedule culminating in a completion milestone, (b) sampling from probability distributions representing uncertainties in the durations of the activities to simulate activity durations from start dates to finish dates, (c) modifying the start date of one of the activities as a function of float or drift of the activity, and (d) using the logic ties, the sampled activity durations, and the modified start date to determine an output representing a simulated occurrence of the base schedule culminating in the completion milestone.

27 Claims, 25 Drawing Sheets

(56) References Cited

U.S. PATENT DOCUMENTS

| | | | |
|---|---|---|---|
| 2008/0195452 A1* | 8/2008 | Ponce de Leon | ............................ G06Q 10/06313 705/7.12 |
| 2009/0089092 A1* | 4/2009 | Johnson | .................. G06F 19/00 705/2 |
| 2009/0216602 A1 | 8/2009 | Henderson | |

OTHER PUBLICATIONS

Finley, Eric D; Fisher, Deborah J. Project scheduling risk assessment using Monte Carlo methods. Cost Engineering 36.10 (Oct. 1994): 24.*

Orczyk, Joseph J.; Hancher, Donn. Schedule Risk Analysis Using Computer Simulation. American Association of Cost Engineers. Transactions of the American Association of Cost Engineers (1987): A.7.1.*

Kim, B-C; Reinschmidt, K F. Probabilistic Forecasting of Project Duration Using Bayesian Inference and the Beta Distribution. Journal of Construction Engineering and Management 135.3 (Mar. 2009): 178-186.*

AACE International Recommended Practice No. 29R-03. Forensic Schedule Analysis. TCM Framework: 6.4—Forensic Performance Assessment. Apr. 25, 2011.

AACE International Recommended Practice No. 29R-03. Forensic Schedule Analysis. TCM Framework: 6.4—Forensic Performance Assessment. Jun. 23, 2009.

AACE International Recommended Practice No. 29R-03. Forensic Schedule Analysis. TCM Framework: 6.4—Forensic Performance Assessment. Jun. 25, 2007.

U.S. Appl. No. 12/687,707, filed Jan. 10, 2010.

* cited by examiner

Risk Manager

Register | Risk View... | Activity View... | Branches | Run | Results

Activities  Filter: Type anything to begin...

| Description | ID | Start Date | Duration |
|---|---|---|---|
| Elevator Shops | | 12/26/2011 | 35 |
| Elevator Fab/Delivery | | 01/30/2012 | 98 |
| Elevator Install | | 05/07/2012 | 35 |
| Equipment Procurement | | 02/03/2012 | 154 |
| Exc. FDN | | 01/02/2012 | 49 |
| FDN Permit | | 11/21/2011 | 28 |
| Finishes | | 06/11/2012 | 21 |
| Gather Equip Quotes | | 12/23/2011 | 42 |

Risk Assignments

| A.. | ID | Group | Likeli... | Distribution | P.. |
|---|---|---|---|---|---|
| ☑ | RSK02 | | 50 | Per % Triangular [0, 5, 10] | ☑ |
| ☐ | RSK01 | | 0 | | ☐ |
| ☐ | RSK03 | | 0 | | ☐ |

Ungroup

Close

FIG. 13

Risk Manager

Register · RBS · Rules

- Risk Correlations
- ✓ Activity Correlations
- Bayesian Sampling

Activities

| Description | ID | StartDate | Duration |
|---|---|---|---|
| Bid/Award Structural Steel, Shops, R ... | | 11/07/2011 | 90 |
| BOD Process Equip | | 10/24/2011 | 60 |
| Building Permit | | 12/05/2011 | 42 |
| Comp. CD Set | | 11/28/2011 | 28 |
| DD Set | | 10/24/2011 | 28 |
| Elevator Shops | | 12/26/2011 | 35 |
| Elevator Fab/Delivery | | 01/30/2012 | 98 |
| Elevator Install | | 05/07/2012 | 35 |
| Equipment Procurement | | 02/03/2012 | 154 |

Correlated Activities

| Coefficient | Description | StartDate |
|---|---|---|
| 0.0 | Roof | 04/23/2012 |
| 0.0 | Permit Set | 11/21/2011 |
| 0.0 | MEP Process Equip | 07/02/2012 |
| 0.0 | Equipment Procurement | 02/03/2012 |
| 0.0 | Int. Walls & Ceiling | 05/07/2012 |
| 0.0 | MEP Controls | 05/28/2012 |
| 0.0 | SD Set | 10/03/2011 |
| 0.0 | Finishes | 06/11/2012 |
| 0.0 | Punchlist Core & Shell | 07/02/2012 |

Close

GRAPHICAL SCHEDULE RISK ANALYZER

COPYRIGHT NOTICE

A portion of the disclosure of this patent document contains material which is subject to copyright protection. The copyright owner has no objection to the facsimile reproduction by anyone of the patent document of the patent disclosure as it appears in the Patent and Trademark Office patent file or records, but otherwise reserves all copyright rights whatsoever.

BACKGROUND

This disclosure relates to schedule risk analysis and, more particularly to analyzing risk in a graphical schedule.

Scheduling a large project with many project activities is a complex endeavor. Once completed, the project schedule is used in project management to predict the completion date of the project. However, there is variability in the project activities and the actual completion date therefore inevitably exceeds the predicted completion date.

SUMMARY

Disclosed is a computer-implemented simulation method for analyzing schedule risk in a graphical schedule. The method includes (a) providing a base schedule that has graphical schedule objects including activities that are connected in a logic network by logic ties, the schedule culminating in a completion milestone, (b) sampling from probability distributions representing uncertainties in the durations of the activities to simulate activity durations from start dates to finish dates, (c) modifying the start date of one of the activities as a function of float or drift of the activity, and (d) using the logic ties, the sampled activity durations, and the modified start date to determine an output representing a simulated occurrence of the base schedule culminating in the completion milestone.

Also disclosed is a computer program that includes software encoded in non-transitory computer-readable media, for analyzing risk in a graphical schedule. The software includes instructions that are operable, when executed, for (a) providing a base schedule that has graphical schedule objects including activities that are connected in a logic network by logic ties, the activities culminating in a completion milestone, (b) sampling from probability distributions representing uncertainties in the durations of the activities to simulate activity durations from start dates to finish dates, (c) modifying the start date of one of the activities as a function of float or drift of the activity, (d) using the logic ties, the sampled activity durations, and the modified start date to determine an output representing a simulated of occurrence of the base schedule culminating in the completion milestone.

A system for analyzing risk in a graphical schedule is also disclosed. The system includes a user interface and at least one processor that is configured to (a) provide a base schedule that has graphical schedule objects including activities that are connected in a logic network by logic ties, the activities culminating in a completion milestone, (b) sample from probability distributions representing uncertainties in the durations of the activities to simulate activity durations from start dates to finish dates, (c) modify the start date of one of the activities as a function of float or drift of the activity, and (d) use the logic ties, the sampled activity durations, and the modified start date to determine an output representing a simulated occurrence of the base schedule culminating in the completion milestone.

BRIEF DESCRIPTION OF THE DRAWINGS

The graphical schedule risk analyzer may be better understood with reference to the following drawings and description. The components in the figures are not necessarily to scale, emphasis instead being placed upon illustrating the principles of the invention. In the figures, like referenced numerals designate corresponding parts throughout the different views.

FIG. 2 illustrates an example graphical schedule risk analyzer Graphical User Interface (GUI).

FIG. 5 is an example deterministic schedule for a project.

FIG. 10 shows an example Risk Manager and Risk Register interface.

FIG. 11 shows an example Prime Risk Definition interface.

FIG. 13 shows another example interface for assigning prime risks.

FIG. 15 shows an example interface to define sampling rules for the simulation.

DETAILED DESCRIPTION

Figure 1:
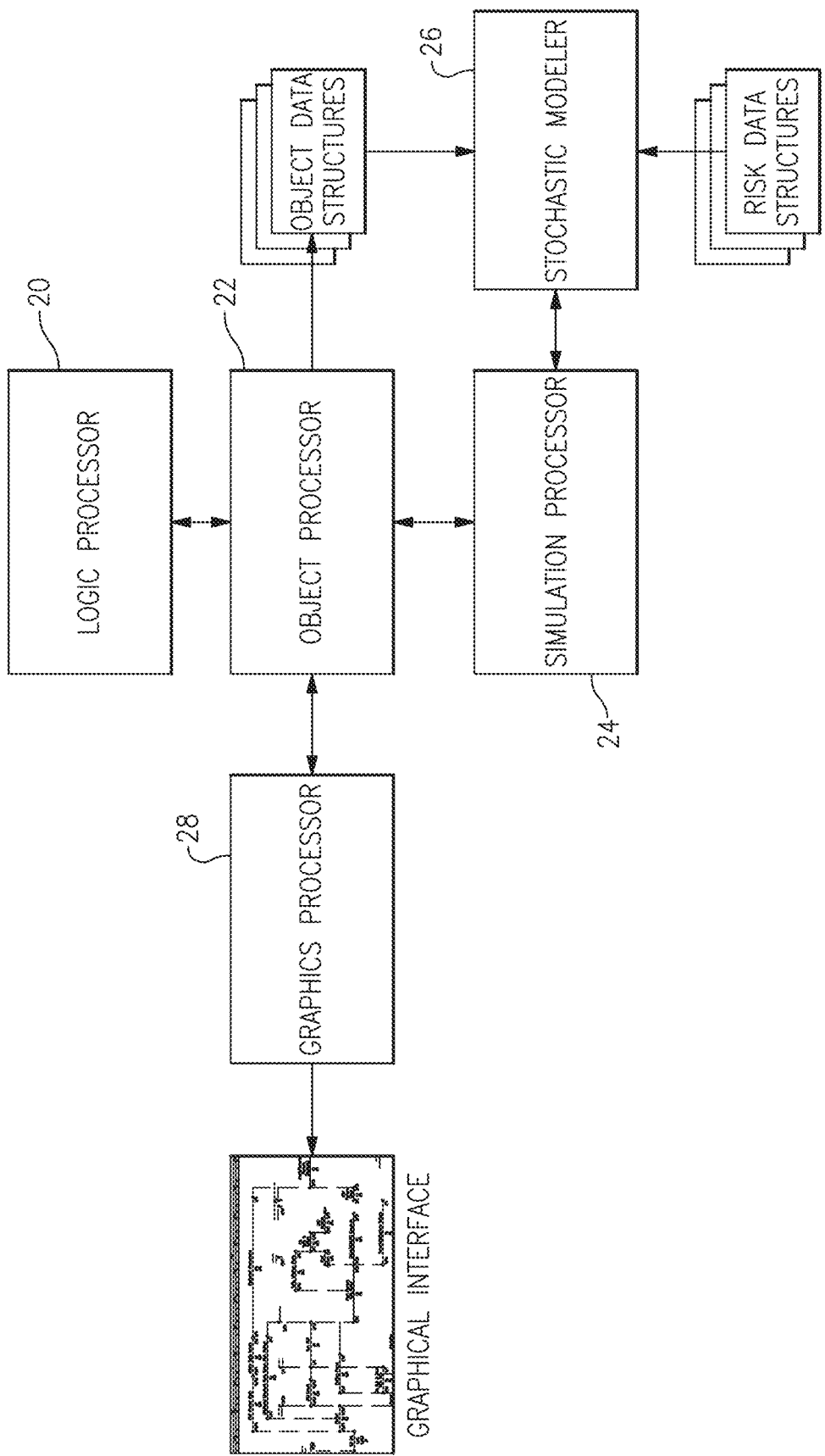
FIG. 1 is a block diagram of an example graphical schedule risk analyzer.

In scheduling, the graphical path method (GPM) embodies a paradigm shift fmm the critical path method (CPM) in that GPM synchronously calculates and displays the schedule as the user physically manipulates activities, logic ties and other schedule objects. The objects include embedded rules that are used to build, calculate and display the schedule. The following definitions may be useful in understanding the disclosure:

activity: schedule object modeling 1) a deterministic activity of scope that is certain to occur; 2) a delay risk that may or may not occur, or 3) an incident, outcome or another result that may or may not occur, which along with other mutually-exclusive outcomes are realized based on the sampled path.

activity duration, duration: a random variable defined by three time estimates (low, mode and high duration value) and associated probability distribution, which together symbolize the activity estimated time of performance from start date to finish date (excluding impacts of other uncertain risks).

benchmark: event equivalent to a milestone with a "must-on" (hard) constraint used to denote an overarching control point or a project deadline. In the present invention, benchmarks behave in a manner similar to milestones but with no-earlier-than and no-later-than date limits.

branching risk: generates stochastic logic involving mutually-exclusive activities that occur based on random selection and that are realized based on the sampled path.

constraint: necessary feature in a CPM schedule when the intention is to possibly override early or late dates that would otherwise result from network logic.

crashing or lengthening event: occurs in a realization when the sampled/risk-impacted duration of the activity being scheduled is shorter or longer than the base-case duration.

criticality index: number or realizations that an activity falls on the longest path as a ratio to the total number of realizations; statistical measure of the probability the activity falls on the stochastic longest path.

cruciality index: as introduced by Williams, a measure of the correlation between the sampled/risk-impacted duration of an activity and the project schedule realized duration.

delay risk: schedule delay that may or may not occur and that is modeled as an activity of uncertain duration that occurs based on random selection and a probability of occurrence.

deterministic schedule: project, program or portfolio logic-network schedule in which all activities and logic ties are certain to occur, the duration of each activity and each lag are assumed to be known with certainty (one time estimate) and there is no stochastic treatment of project, program or portfolio risks whatsoever. More generically referred to as the "base-case scenario" when activity deterministic durations and embedded nodes with uncertain lags may alternate between the deterministic, mean or mode values.

drift: at any juncture in a realization, the extent an activity yet to be rescheduled that is on planned dates may gain schedule, and that is required to calculate total float, as drift plus float yields total float. For the activity, drift existing at the beginning of the realization, if any, is base-case drift.

early dates: earliest start/finish dates in a realization for activities on early dates in the base-case schedule and that neither float nor pace; calculated based on sampled/risk-impacted durations for predecessor activities that occur in that realization and sampled lags for logic ties with uncertain lag values and the deterministic or stochastic nature of the pertinent logic ties.

embedded node, embed: event intermediate of, or right on, the start or finish node of an activity, through which the activity is connected to a predecessor or successor activity, milestone or benchmark.

event: incident, accomplishment or another result that occurs in an instant (zero duration).

float: at any juncture in a realization, the extent an activity yet to be rescheduled may be delayed and not delay the completion date, and that is required to calculate total float, as float plus drift equals total float. For the activity, float existing at the beginning of the realization, if any, is base-case float.

floating: in GPM simulation, event that occurs based on random selection and that involves delaying or advancing the start of a floating-eligible activity, sampled as floating in a realization, within its float or drift, respectively, then existing in the realization when the activity according to network logic is rescheduled.

floating risk: in schedule simulation, risk that occurs when a delayed activity that falls on the longest path in a realization would have otherwise not been critical but for the floating action; occurs when the floated activity, at the end of the realization, has positive drift, zero float and the smallest total float gap, link gap or logic tie gap: for two related activities, the extent the predecessor may be delayed and not delay the successor. An actualized gap measures actual delay, floating or pacing left of the data date.

graphical path method (GPM®): planning/scheduling method premised on objectbase principles that, when applied to simulation, in each realization, modifies the base-case scenario one activity at a time, in logical order, by 1) allowing the activity, if sampled as floating or pacing, to shift to a late or an earlier date based on its float consumption threshold, substituting the activity duration with the sampled/impacted duration along with sampled lags on links originating and links terminating at the activity and crashing or lengthening the activity, 2) recalculating lags, gaps, early/planned dates, drifts, floats and total floats for predecessor and successor objects that are affected by the crashing, lengthening or other simulated event, and 3) cycling to the next activity and, so forth, until all activities and, where applicable link lags, have been simulated at their sampled/impacted values.

impact: degree that a prime risk sampled as occurring impacts sampled duration for the risk-activity pair, stated as a positive percentage or differential (opportunity) or negative percentage or differential (threat).

lag or offset: minimum interval between the connected dates of two logically-tied activities, which, if uncertain, may be defined by three lag estimates (low, mode and high lag value) and associated probability distribution.

late dates: latest start/finish dates in a realization for activities and milestones and that can be derived by adding float to the calculated early dates or planned dates (whichever applies).

link driving index: probability that a link drives the successor activity, calculated as the percentage of realizations the link acquires a zero gap.

logic tie or link: dependency between two schedule objects, with or without an embedded node, and with or without a lag.

milestone: event symbolizing a targeted schedule accomplishment for the project; if not constrained, a start/finish milestone is controlled by the earliest start/latest finish date of its successor/predecessor activities.

network or logic network: time-scaled display of the schedule comprised of rule-encoded, algorithmic objects symbolizing activities, milestones and benchmarks that are connected by logic tie objects with the capability of having embedded nodes and lags.

node: event symbolizing the start or finish of an activity. An "and" node occurs when all merging predecessors are realized; an "of" node occurs when the sampled merging predecessor is realized; an "any" node occurs when any merging predecessor is realized; and an "if" node occurs if its merging predecessor is realized.

objectbase: relative to GPM simulation, collection of rule-encapsulating objects that inherently interact via message passing to shift and recalculate schedule attributes for objects affected by a simulated event p parameter: probability of occurrence associated with a schedule object or an uncertain risk.

pacing: in GPM simulation, event that occurs based on random selection and that involves delaying the start of a pacing-eligible activity within its float then existing in the realization when the activity according to network logic is rescheduled, provided its then-existing float exceeds its base-case float by a designated threshold.

pacing risk: in GPM schedule simulation, risk that occurs when a paced activity that falls on the longest path in a realization would have otherwise not been critical but for the pacing action; occurs when the paced activity, at the end of the realization, has positive drift, zero float and the smallest total float.

planned dates: start/finish dates in a realization for activities on planned dates in the base-case schedule or on early dates but that are floated or paced; calculated based on sampled/risk-impacted durations for predecessor activities that occur in that realization and sampled lags for logic ties with uncertain lag values and the deterministic or stochastic nature of the pertinent dependencies.

portfolio: collection of projects or programs and other work that may not be necessarily related but that are grouped together to facilitate effective management consistent with strategic business objectives.

prime risk: risk assigned to two or more activities, possibly with different probability of occurrence vis-à-vis each activity, which, if occurring for an activity, impacts the sampled activity duration by an impact stated as a percentage factor or differential value, which itself may be ranged (low, medium and high impact).

priority index: activity importance relative to impact on project completion, which is calculated as criticality index (1+cruciality index).

program: group of related projects managed in a coordinated way to obtain benefits and control not available from managing them individually.

realization: outcome of one iteration deriving one schedule during the simulation, which is based on defined probability distributions and other stochastic constructs.

risk: an incident, outcome or another result that is uncertain and that impacts the duration's of an activity/ies, causes a delay, fragnet risk or branching risk or involves floating or pacing an eligible activity.

risk driver: a particular case of a prime risk that, if occurring, occurs with the same probability of occurrence and the same percentage impact for all activities designated as impacted by the risk.

schedule simulation: computer modeling of a deterministic schedule that translates duration variability and other uncertain risks at the activity level into their impact on completion along with criticality and priority.

simulation model: deterministic schedule adjusted for activity duration variability, prime risks and stochastic activities and dependencies modeling delay risks, branching risks and fragnet risks.

synchronous: relative to conventional scheduling, interface that in real time and in response to and during physical manipulation by the user of schedule objects recalculates the schedule only to the extent directly or indirectly impacted by the physical manipulation and displays in real time the entire schedule in its instant state.

total float: in each realization, the extent an activity may be delayed beyond early dates, or both be delayed and gain schedule from planned dates, without delaying completion; calculated as drift plus float.

In schedule risk analysis, one aspect that GPM differs from CPM is that, in each realization (i.e., iteration), a simulated schedule symbolizes an actualized version of the deterministic schedule that is developed by modifying the base-case schedule one activity at a time, in logical order, in the same way that the schedule would unfold on the project. Because, in each realization, the GPM simulation algorithms modify the base-case schedule one activity at a time, eligible activities may be randomly floated or paced, which models real-life situations that CPM cannot. In CPM risk analysis, the only schedule that exists in a realization is the final schedule: all activities are at their sampled/impacted durations, a forward pass causes every activity to start on its earliest possible date and neither floating nor pacing is permissible.

Examples in the present disclosure may be referred to as a graphical schedule risk analyzer (SRA) application. In addition to floating and pacing, one or more example graphical SRA applications are operable to 1) utilize planned dates in the base-case schedule as an option to start-no-earlier (SNE) constraints or early dates; 2) model risks that impact activity durations as occurring with a different probability and different impact on each affected activity/group of activities; and 3) in each realization, simulate the schedule by replacing base-case durations with sampled/risk-impacted (simulated durations), along with replacing the requisite base-case lags with sampled lags, one activity at a time, in logical order, and by synchronously performing GPM algorithms that recalculate lags, gaps, early/planned dates, drifts, floats and total floats for predecessors/successors affected by the crashing, lengthening or other causal event.

An example graphical SRA application is shown in FIG. 1 and includes a logic processor 20, an object processor 22, a simulation processor 24, a stochastic modeler 26 and a graphics processor 28, each processor 20, 22, 24, 26, 28 may include software, hardware or both and may be further subdivided or combined in one or more processors or modules. The application may be implemented in one or more computer programs executing on one or more programmable systems comprising at least one processor and at least one data storage system. Each program may be implemented in any desired computer language to communicate with a computer system. The application may also include a network that enables the processors 20, 22, 24, 26, 28 and/or other computing devices to communicate and exchange data, including any communication method by which information may travel between computing devices. The network may include one or more of a wireless or wired network, a local or wide area network, a direct connection such as through a Universal Serial Bus port, and the set of interconnected networks that make up the Internet, an Intranet, or other network.

In this example, the application utilizes objectbase principles, where the objects contain GPM embedded rules and computational algorithms that interact with one another in each realization of a simulation to cause a simulated occurrence of the deterministic schedule using sampled durations, sampled lags for links of uncertain lag value and risks sampled as occurring, one activity at a time, in logical order, until all objects have been rescheduled at their sampled/risk-impacted durations.

Figure 2:
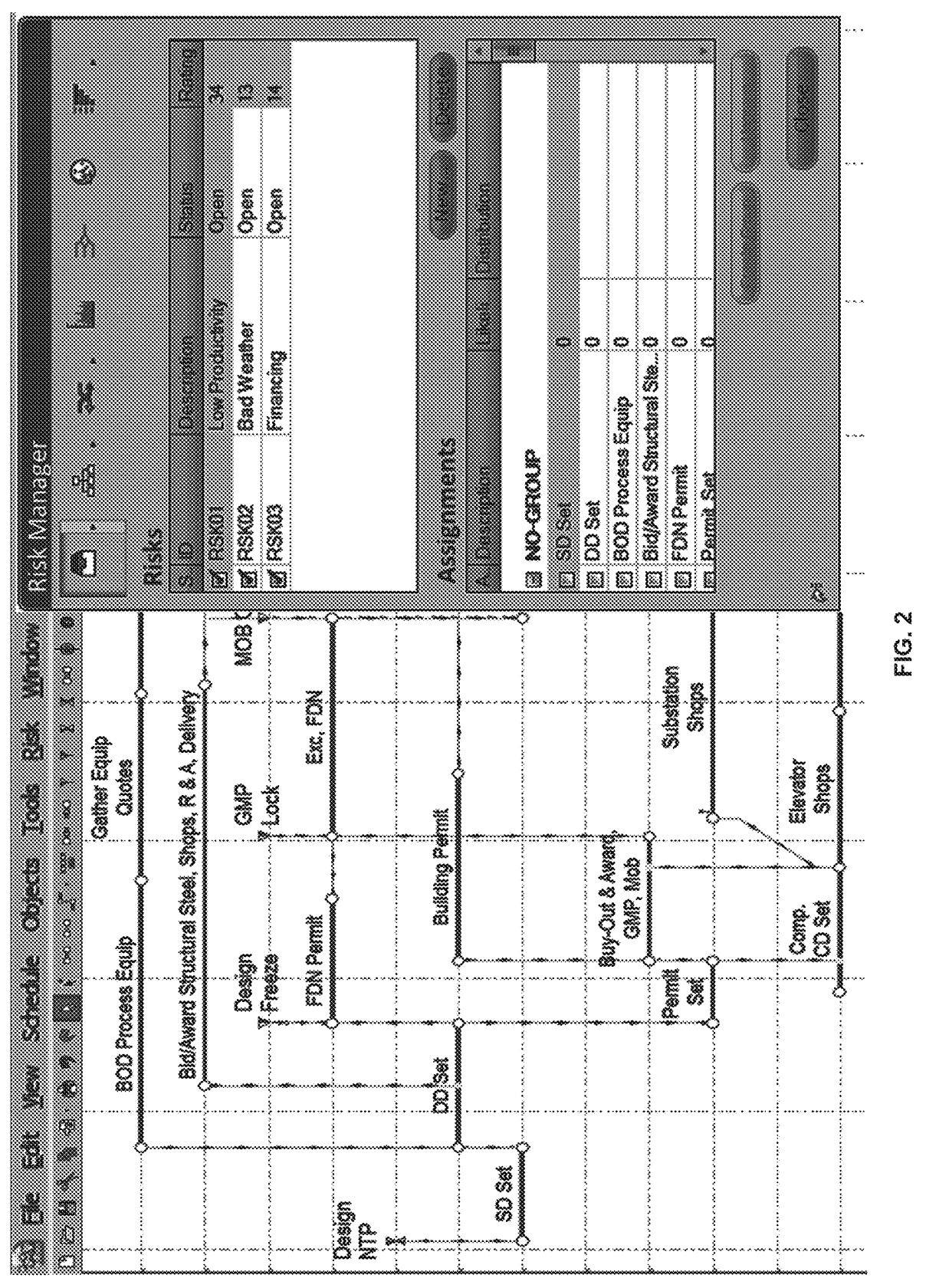

FIG. 2 shows an example user interface for a graphical SRA application. In this example, the interface includes (i) a time-scaled view over which the deterministic schedule and risk model is built, (ii) toolbars and menus that provide methods and supporting functions to create the model, and (iii) the Risk Manager, which provides methods to create, document and manage the simulation model, run simulations and display results. These components may be implemented in combination or can be further divided into separate subcomponents.

Figure 3:
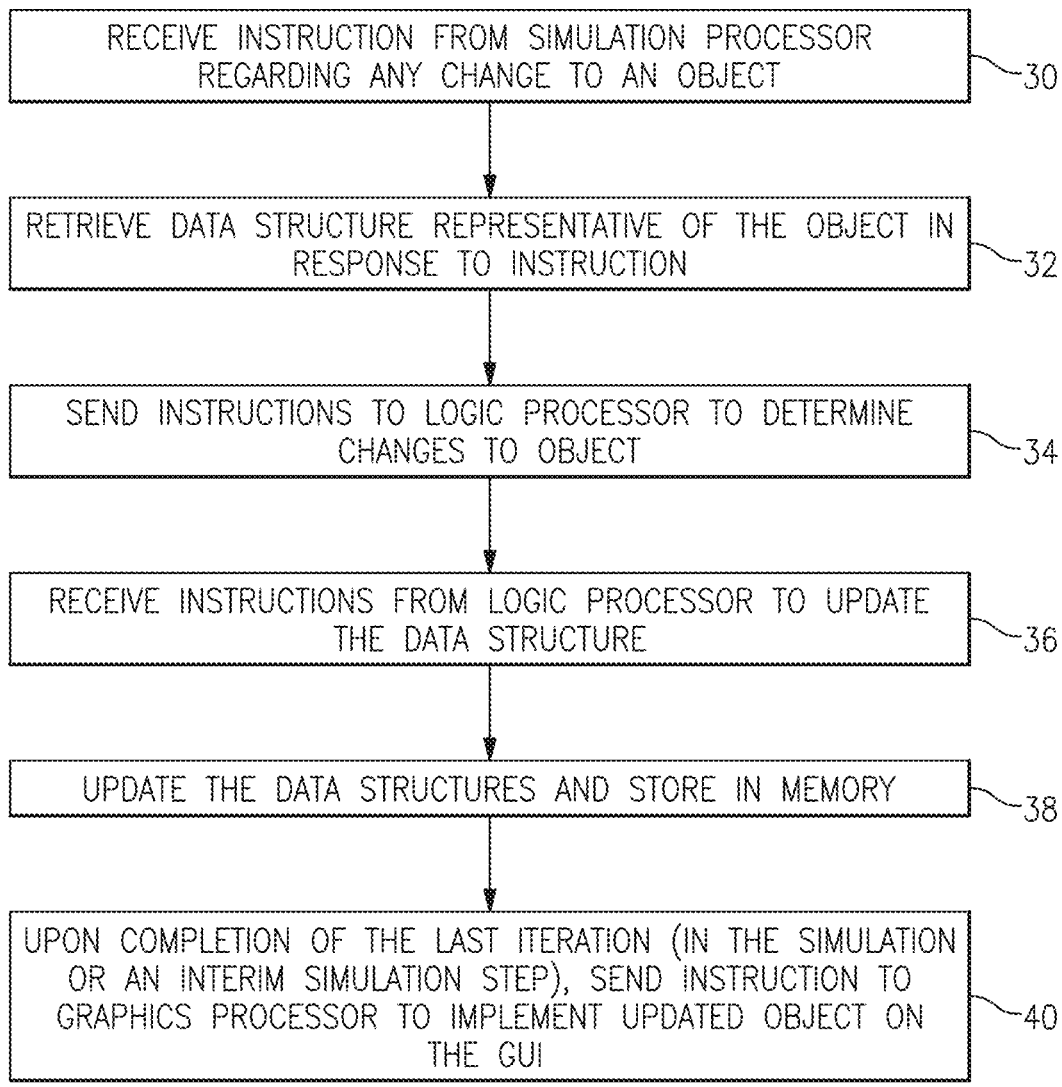
FIG. 3 is a flow chart of an example of the operation of the object processor.

FIG. 3 illustrates a flow diagram of the object processor 22. The process begins at 30 with the object processor 22 receiving instructions from the simulation processor 24 about a change to an object/group of objects, such as a positional change that involves a shift or crashing/lengthening event. The object processor 22 retrieves the data structures at 32 for the object or group of objects and sends instructions to the logic processor 20 at 34. The object processor 22 receives instructions from the logic processor 20 at 36 to update the data structure for the object, updates the data structure at 38 and stores the updated data structure in memory. Upon completion of the last realization (in the simulation or interim simulation step) at 40, the object processor 22 sends the current state of the data structures for the modified objects to the graphics processor 28, and the graphics processor 28 converts the data into pixel information to render the display on the GUI (FIG. 2).

Figure 4:
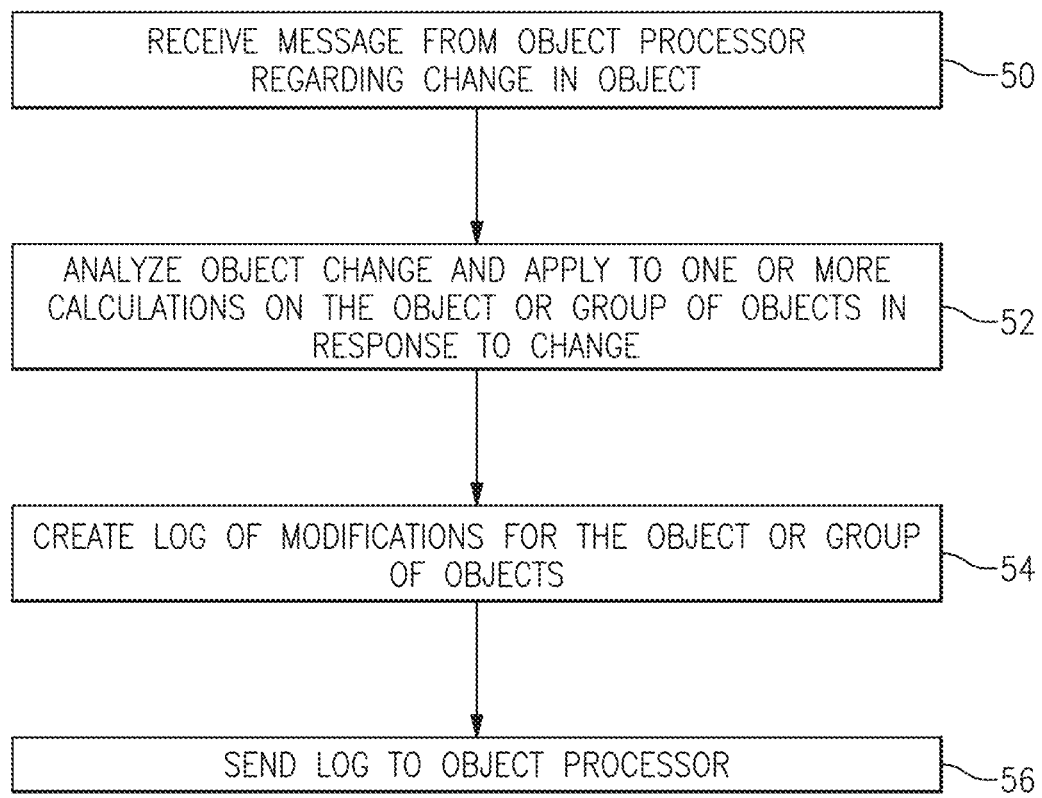
FIG. 4 is a flow chart of an example of the operation of the logic processor.

FIG. 4 illustrates an example process of the logic processor 20. The process begins at 50 when the logic processor 20 receives a message from the object processor 22 with a change in an object that requires a calculation on the object. The logic processor 20 analyzes the object change at 52 and applies one or more calculations on the object.

In response to the object change, the logic processor 20 may shift the object and predecessor or successor objects and/or calculate lags, gaps, floats, drifts and total floats for deterministic predecessor and successor objects based on the longest path or shortest path, and for stochastic objects based on the sampled path. Predecessor and successor objects shift based on the GPM simulation algorithms, which are capable of identifying the portion of the logic network, also known as fragnet, which originates at the activity being shifted and lengthened or shortened (longer or shorter sampled vs. base-case duration). The fragnet includes that activity's immediate successors, those successors' respective immediate successors, and so forth, culminating with the last successor(s) in the activity's fragnet according to network logic. If a successor is without a driving predecessor (i.e., no merging zero-gap link) because it starts on a planned date or is floating or pacing in that realization, the GPM algorithm inserts a temporary pseudo lag on the merging links sufficient to create at least one zero-gap merging link. The logic processor 20 creates a log of the modifications at 54 that were applied to the object/group of objects and records each modification that the object processor 22 will need to update after the calculations have been applied. The log is sent to the object processor at 56.

At the end of each realization, the object processor 22 stoles relevant statistics for the objects, namely, lags, gaps, start/finish dates, drifts, floats and total floats, and increases the criticality count of activities that fall on the longest path. The longest path is determined by the logic processor by applying the GPM criticality algorithm that is capable of identifying a critical path with embedded drift and positive total float on account of an activity that floated or paced or that is on a constraint or planned date in the base-case scenario.

Figure 5:
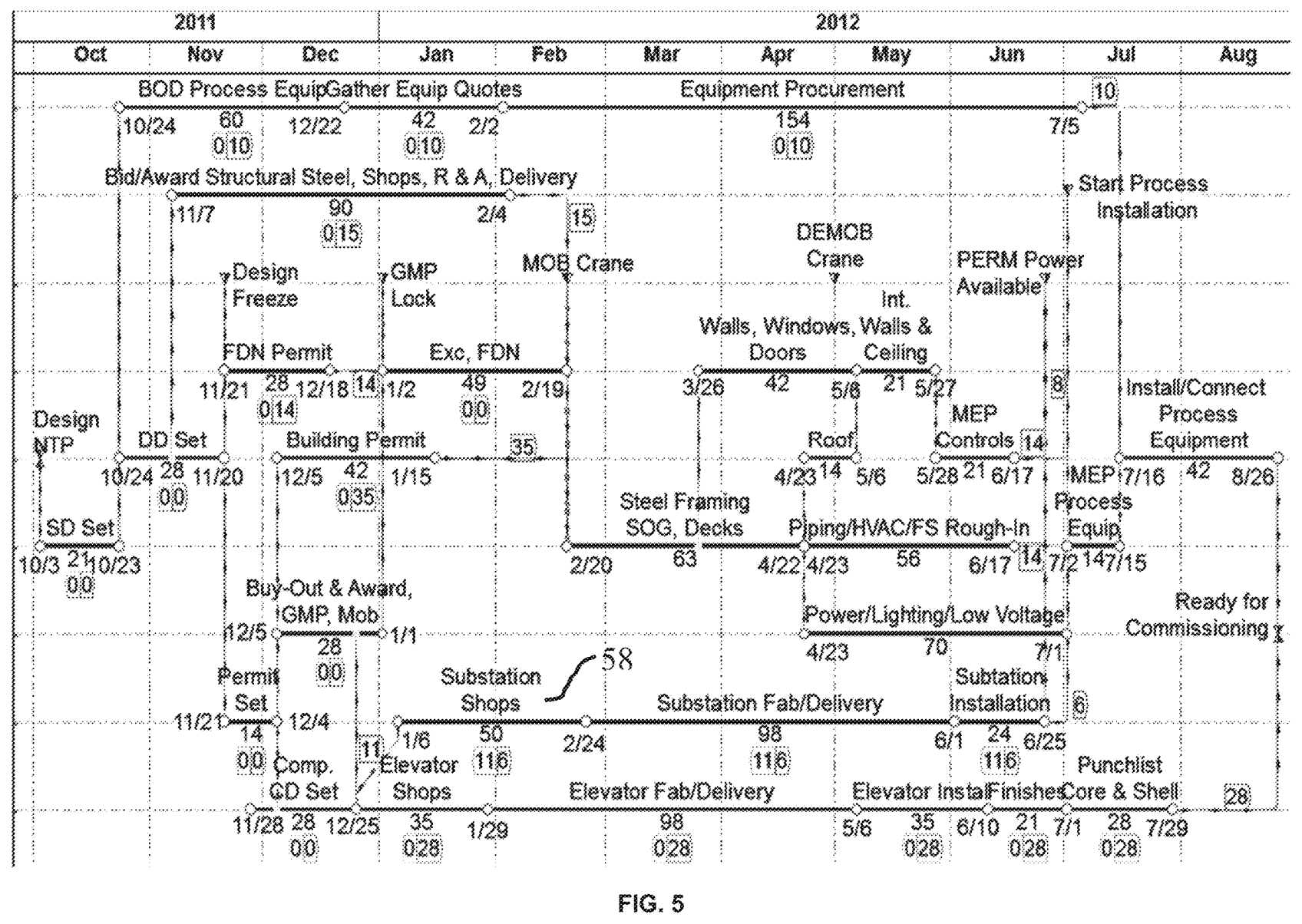

An example deterministic schedule built using the logic diagramming method notation and GPM algorithms is shown in FIG. 5. The "Substation Shops" activity shown at 58 is on a planned start date (rather than the conventional CPM early start date), because it reflects a constrained start date controlled by a third party. Drift and float values are also shown below each activity and centered between the start and finish dates. Activities, delays, milestones, benchmarks, and embeds on the time-scaled display may be linked and represent dependencies between the schedule objects. The calculation of lags, gaps and activity floats, drifts, total floats, early dates and late dates is based on the GPM scheduling algorithms.

In a deterministic schedule, activity durations are fixed (unless modified by the user), resulting in fixed lags, gaps, dates, drifts, floats and total floats for the schedule objects (unless modified by the user). However, there is uncertainty in the project that can randomly influence the schedule objects, for example, the activities, activity durations and activity start/finish dates. The uncertainty, in turn, impacts the entire schedule. A single representation of a deterministic schedule thus represents only a single possibility out of many possible scenarios that can unfold as the project progresses.

The logic network, as developed on the time-scaled display, often represents the deterministic state of the schedule. For example, for activities, the start/finish dates, durations, drifts, floats and total floats calculated for the deterministic scenario are referred to as deterministic start/finish dates, deterministic durations, deterministic drifts, deterministic floats and deterministic total floats, respectively. The deterministic state of the schedule may also be defined as a function of the stochastic properties of the schedule. For example, activity durations in the deterministic schedule may be defined as the mode or mean durations.

Schedule risk analysis involves estimating the probability of achieving target dates for milestones and the project completion along with criticality of the activities in stochastic terms. CPM schedule risk analyzers are limited by the CPM algorithm early-dates bias, the inability of CPM to model floating and pacing (which requires that activities be scheduled at dates later than their earliest dates) and other scenarios that often occur on real projects. The graphical SRA application, on the other hand, provides the ability to schedule activities with drift (on planned dates) and create scenarios that more realistically model the actual system. The schedule simulation examples described in the present disclosure provide a method for analyzing risk not only for project schedules but also for program and portfolio schedules.

To develop a stochastic model of a schedule, stochastic properties associated with schedule objects are defined. Each object is modeled to accurately represent realistic scenarios, and the appropriate stochastic properties are provided as input to the graphical SRA application. This process is referred to as modeling. With each type of object, new specific methods are associated, which allow modeling of a broad range of scenarios.

Figure 6:
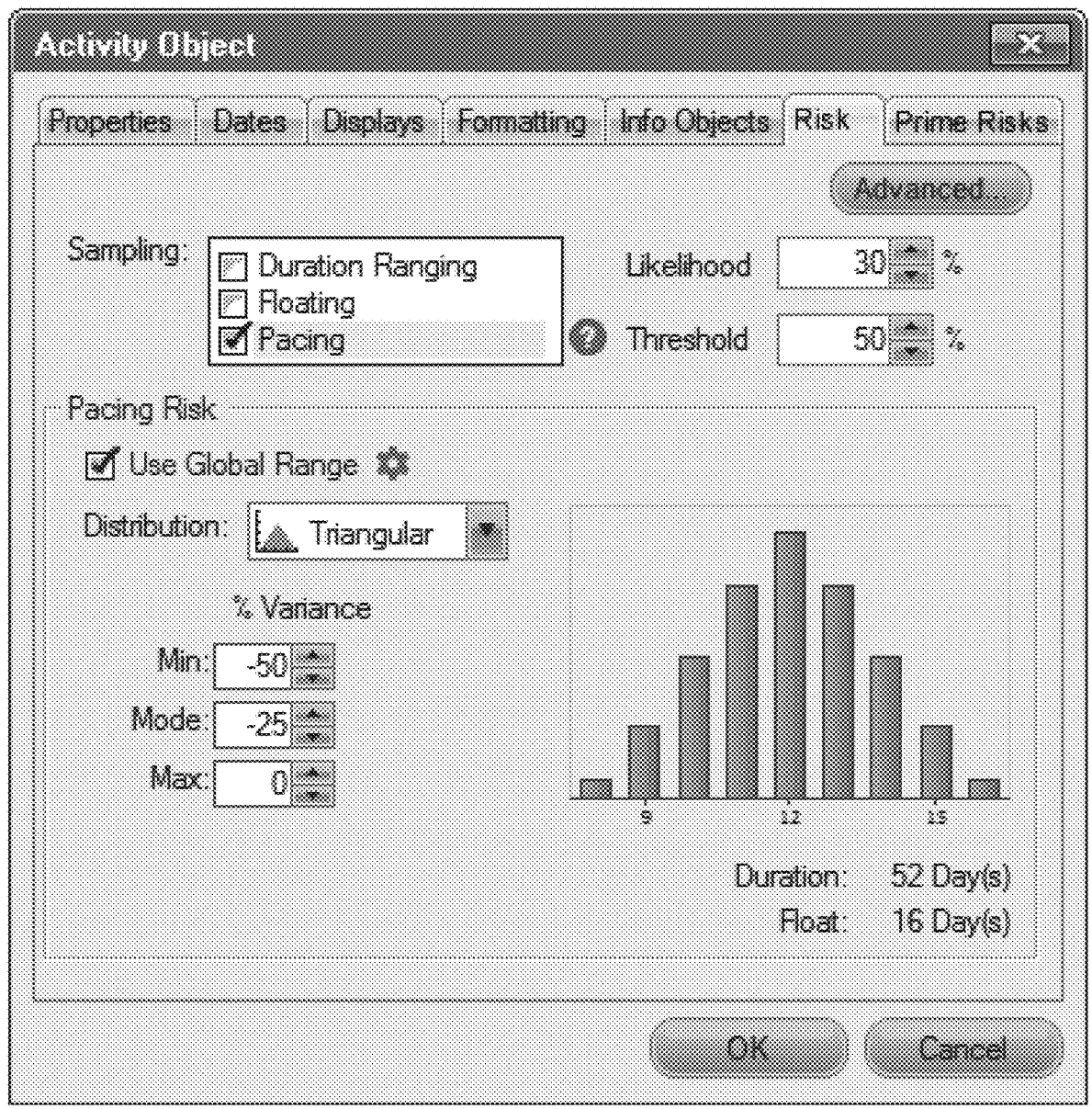
FIG. 6 shows an example Activity Properties interface.

FIG. 6 shows an example Activity Properties dialog interface that is used to establish stochastic parameters associated with an activity. The interface allows modeling three categories of uncertainty, namely duration, floating and pacing. Duration sampling models uncertainty that determines the duration of the activity. The duration uncertainty is modeled by selecting the check box for Duration and specifying a probabilistic distribution that most closely represents the inherent uncertainty. For example, the uncertainty is based on historical data or experience. The interface also provides a representation of the distribution to help a user validate the distribution against the perceived modeled uncertainty. In a further example, the interface also implements methods to validate the data entered by a user in order to prevent them from making mistakes, such as defining a maximum value to be lower than a minimum value. Further, the interface also provides techniques to define a general distribution by drawing it on the dialog or specifying a valid mathematical function for the distribution.

Uncertainty or variability in lag values can be represented using three-point estimates and associated probability distribution in a manner similar to that described for activity durations and uncertain risks. During a realization, when an activity is scheduled, uncertain lags on links originating and links terminating at the activity are replaced with sampled lags. Another approach to representing lag variability is to define it as a percentage of activity duration, in which case the lag correspondingly shortens or lengthens in response to the related activity simulated duration to maintain the designated percentage value.

Floating sampling models decision-based scenarios where, in a realization, the start of an activity may be delayed or advanced if it has sufficient float or drift, respectively, at the juncture in the realization when the activity is rescheduled. The modeling considers the then-existing float or drift of an activity that is eligible for floating and that is sampled in that realization as floating, and either delays or advances the activity within its then-existing float or drift range, respectively, based on three positive values (for floating) or negative values (for drifting) of float consumption and an associated probability distribution function. Modeling can also control how often the activity eligible for floating is actually floated during simulation by defining a likelihood factor. For example, a likelihood factor or "p parameter" of 50% means that the activity eligible for floating will float in 50% of the realizations. The percentage of float consumption by which a floating-eligible activity is delayed or advanced is modeled using a probability distribution that is described in a manner similar to defining the uncertainty in the activity duration (i.e., low, moderate and high float consumption).

Pacing sampling models decision-based scenarios that involve delaying the start of an activity eligible for pacing because its float has increased as predecessors and unrelated activities elsewhere in the network have been rescheduled in a realization. When an activity is considered for pacing, all its predecessors, and other non-related activities, have already been rescheduled at their sampled and risk-impacted durations, leading to either an increase or a decrease in the float of the pacing-eligible activity relative to its base-case float. With the base-case duration, pacing considers the then-existing float when the pacing-eligible activity is rescheduled and its base-case float, and delays the activity when the ratio of then-existing float to the base-case float surpasses a defined threshold. Similar to floating, modeling can control how often the activity is paced by defining a "p parameter" and probability distribution to sample the amount of time by which the activity is paced. In addition, the modeling utilizes a threshold representing the ratio of then-existing float to base-case float. In any realization, even where pacing for a pacing-eligible activity is sampled as occurring, the activity will be paced only if the ratio of then-existing float at that particular juncture in the realization to base-case float exceeds the designated pacing threshold.

GPM simulation is capable of modeling floating and pacing decisions because, in each realization, the simulated schedule starts as the base schedule and is developed by modifying the base-case schedule, activity by activity, based on sampled durations, lags and risks. Floating (forward or backward) or pacing the activity in GPM as function of its float or drift is an available option in simulation, just as it would be when the project is actually performed, whenever the activity has float or drift, albeit different from the base-case float and drift. These types of decision-based scenarios are not possible in comparison CPM simulation because 1) drift is always zero in a CPM schedule comprised solely of early dates, and 2) no activity has any float (total float in CPM) whatsoever until all activities have been scheduled at their sampled/impacted durations on their earliest possible dates, at which point, the CPM algorithm is able to calculate total floats for the one version of the simulated schedule that exists at the end of the realization.

A probability distribution for any of these scenarios can be defined using a default set for the project (all objects) or a default set for a group of objects (fewer than all of the objects of a schedule). The default set can be referred to as a "global distribution." To assign the global distribution to an activity, the user can check the box next to the option "Use Global Range." If the global range has not been defined, an interface similar to the one presented in FIG. 6 to describe the probability distribution is presented to define a global distribution. In an embodiment, additional requirements may be added to define a global distribution, such as requiring a percentage-based description of the distribution parameters.

Figure 7:
FIG. 7 shows an example Activity Advanced Properties interface used to assist in establishing the behavior of an activity during simulation.

FIG. 7 shows an example of an advanced properties interface that can be used to define the behavior of an activity during simulation relative to SNE constraints, GPM planned dates and remaining duration sampling for in-progress activities. The interface is divided into three parts and overrides the default behavior of the particular activity. The first part controls whether the SNE constraint on an activity will be considered during the simulation. During simulation, a constraint applied to an activity can potentially override earlier dates that would otherwise result from network logic. For this reason, constraints are typically not used during simulation. SNE constraints can participate in the simulation and can be controlled through this interface. If the constraint is ignored during the simulation, the start date of the previously-constrained activity will shift to its early date in the base-case scenario. If the constraint is made a planned date, the activity may shift to an earlier date, if allowed by its predecessors and possibly gain some drift and some float, following which, the base-case schedule is correspondingly recalculated using the GPM scheduling algorithms. If the constraint is maintained, the activity or delay cannot shift earlier than the constraint date specified. If the constraint is removed for the simulation, the activity maintains its original planned date and silently ignores any constraints.

The alternate part of this interface allows modeling to proceed with the constraint date as a planned date for the purposes of the simulation, which restores drift (and thus total float) to the previously-constrained activity based on network logic, following which, the base-case schedule is correspondingly recalculated using the GPM scheduling algorithms. Unlike a constraint date, a planned date may shift to earlier dates in a realization if predecessors on logic chains leading to the planned-date activity are sampled at the right mix of lower durations than base-case durations. The simulation results will reveal whether the stochastic nature of the network allows earlier dates than the planned date, without the need to investigate alternate scenarios to determine whether earlier SNE dates may improve completion probability thresholds, because the graphical SRA application develops statistics for start dates, including probability distribution functions.

The second part of the interface allows a planned date or reverts the planned date to the corresponding early date. The example interface envisions that in certain cases the opposite behavior during simulation could be preferred, and that the activity should be scheduled on the early dates in all realizations. However, even where modeling is based on activities reverting to early dates on the onset of each realization, as the example graphical SRA application allows floating and pacing, it is possible for activities to end up on planned dates in a realization.

The third part of the interface controls how the associated uncertainty is modeled when the activity is in progress. In-progress activities are defined as those with a start date earlier than the current data date (i.e., closing date that splits the updated schedule between the progressed portion of the schedule left of the data date and the forecast portion of the schedule right of the date). The selection could be made between a proportional or conditional behavior. The proportional behavior assumes that the uncertainty associated with the activity is proportionately spread over the entire duration and therefore the remaining duration for the activity is calculated as:

$$\left(\frac{\text{Deterministic Duration} - \text{Elapsed Duration}}{\text{Deterministic Duration}}\right) \times \text{Sampled Duration}$$

The conditional behavior for the activity's remaining duration modifies the duration distribution when, for example, the elapsed duration for the activity exceeds the minimum value for the probability distribution. In any such case, the example application evaluates a conditional probability distribution based on the knowledge that the duration of the activity cannot be between the previously known minimum and the elapsed duration. This behavior thus enables the system to optimally use the available information and incorporate that knowledge about the activity into the simulation without requiring the user to modify the distribution within the model.

Figure 8:
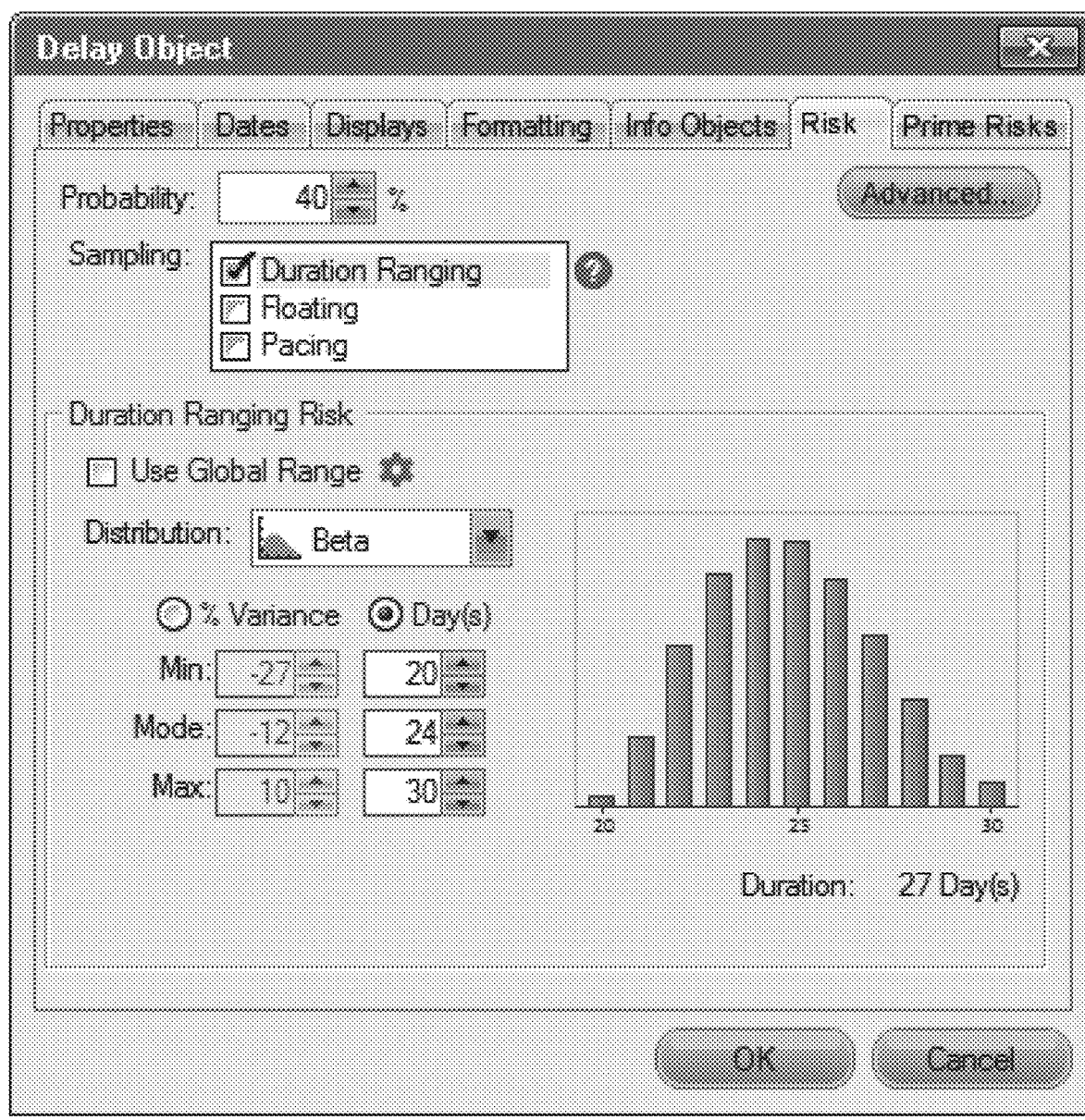
FIG. 8 shows an example Delay Properties interface used to assist in establishing stochastic distribution and parameters associated with a delay.

FIG. 8 shows an example interface for defining the stochastic properties for delay objects included in the deterministic scenario using a "placeholder" duration. In the example, delays represent activities whose occurrence is uncertain. For example, during an earth-moving project, there is a possibility of finding objects of archaeological significance, and in that scenario, additional work needs to be performed along with the other activities that are certain for the project. The interface for defining stochastic properties of a delay is similar to that for activities and provides the same flexibility in controlling the behavior of delays during simulation. Delays, however, have an additional "p parameter" that represents the probability of occurrence of the delay and thus models the uncertainty in the occurrence of the delay. A value of 50% for the p parameter indicates that the delay materializes in 50% of the realizations.

Figure 9:
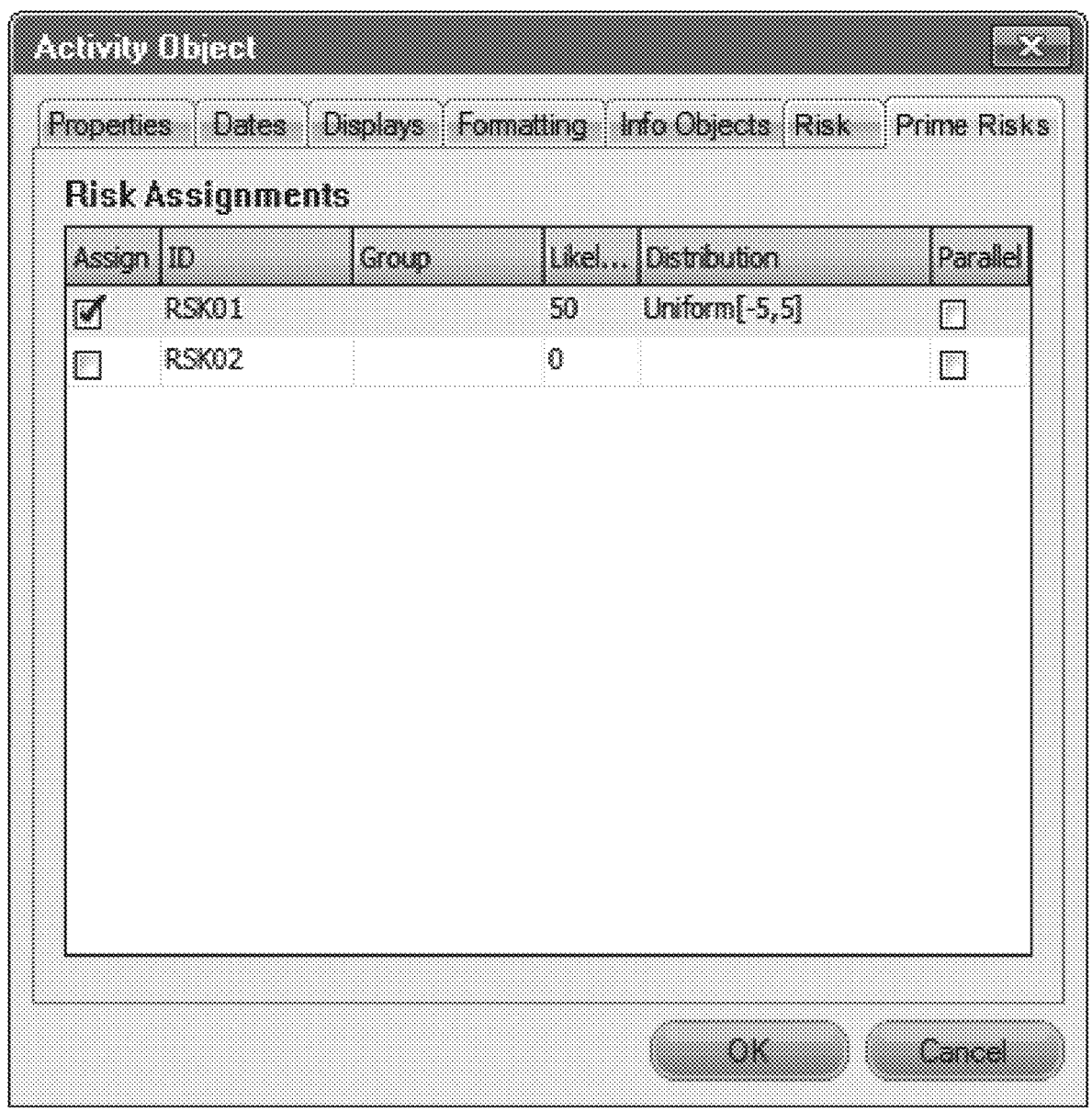
FIG. 9 shows an example interface for assigning risks to an activity.
Figure 11:
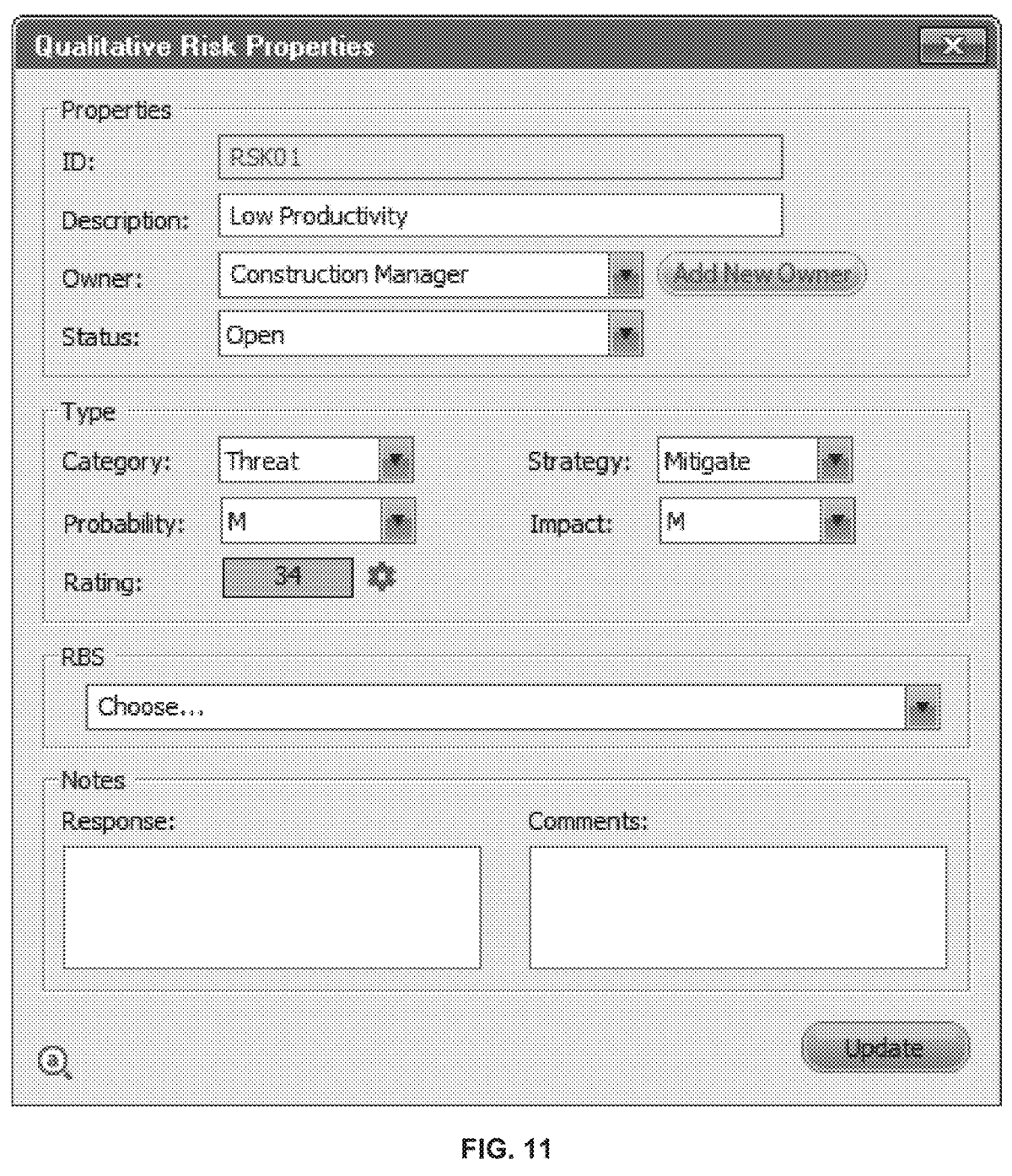

FIG. 9 shows an example interface to assign prime risks. Before a prime risk may be assigned to an activity, it must first be defined for the project FIG. 11 shows an example interface for defining a prime risk. The list of risks is populated into the interface shown in FIG. 9, where the user can check the box next to a prime risk to assign it to the current activity. To define the uncertainty in the impact on activity duration, a probability distribution must also be defined using an interface similar to the one in FIG. 6.

Figure 10:
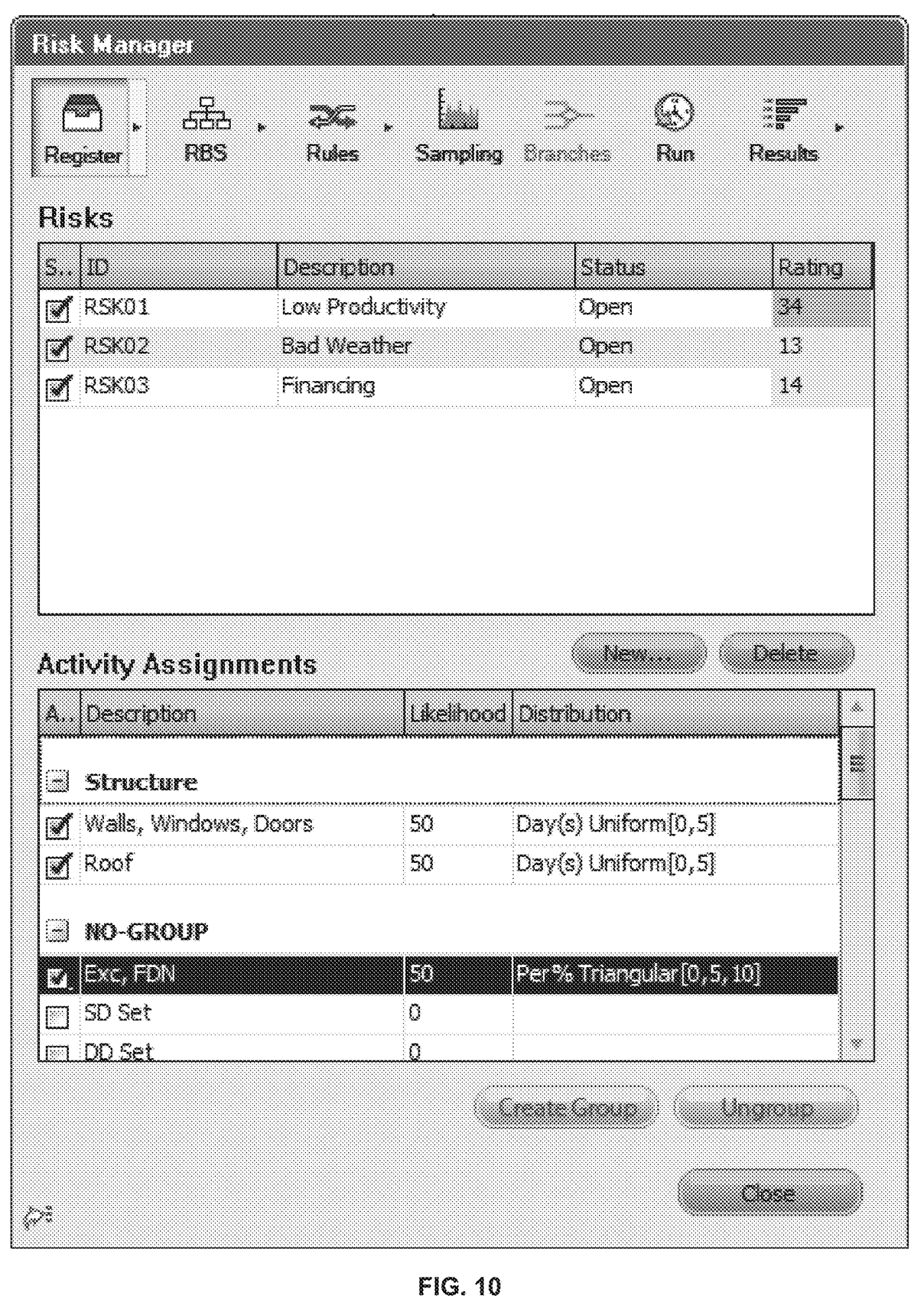

FIG. 10 shows an example interface for a Risk Manager used to build the simulation model. Along the top of the interface, buttons/menus identify various aspects of a stochastic model and, on selecting an option, the interface of the Risk Manager updates its view/interface to provide the relevant methods to build the stochastic model. The Risk Manager provides a unified interface that incorporates all methods necessary to build a stochastic model, and is simple, intuitive and convenient. The different views available are: Risk Register, Risk Breakdown Structure, Rules, Sampling, Probabilistic Branching, Run Simulation and Results. The selected view is identified through a depressed button at the top of the Risk Manager.

The presented interface and its views are only provided as one possible interpretation of the interface. The interface may be implemented as separate components or combinations thereof. The various components can also be grouped in a manner different to the example interface.

FIG. 10 also shows an example interface of the Risk Manager with the Risk Register view. The Risk Register view provides an interface to document various prime risks associated with the project and assign them to the activities. The table in the top half of the Risk Register view shows the Risk Table which lists all prime risks that have been added to the project, using columns for the different properties of the risk. The view also allows modeling to include/exclude prime risks from the simulation by simply checking or unchecking the box in the sample column. The lower half of the interface shows the Activity Table which lists all the activities in the logic network. The Activity Table updates every time the selected Risk is changed in the Risk Table, and shows the activities to which the selected Risk is assigned. The assigned activities show a check mark in the Assign column of the activity table and a probability distribution to define the impact of the prime risk on the activity duration. Activities can be assigned/unassigned by simply checking/unchecking the box in the Assign column corresponding to the activity.

A prime risk, when assigned to an activity, forms an Activity-Risk Pair. The occurrence, or existence, of the prime risk is defined for each pair independently, which allows, during a realization, the same risk to occur for one pair but not occur for another, and, if occurring for multiple pairs, causing different additive or subtractive impacts on the duration of each associated activity. Comparison simulation tools based on CPM define the existence only once, with the impact stated as a common percentage factor for the so-called risk driver, which in turn restricts the risk to always occur/not-occur during a realization for all associated activities, and if occurring, causing the same percentage impact on all the associated activities. However, this assumption does not always conform to reality; for example, if bad soil is encountered during excavation for the foundation in the SW part of a building, it does not mean that the risk will also occur and impact at the same level the NW part of the foundation excavation. In the present disclosure, allowing modeling to define an activity-risk pair for which the occurrence of the prime risk is independent, overcomes this significant limitation and more realistically identifies and evaluates each risk from the results of the simulation. For each activity-risk pair, the impact of the prime risk on the activity can be defined with a probability distribution in a way similar to defining the distribution for activity duration. When a prime risk is sampled as occurring during a realization, its impact is sampled on the pair and the sampled duration of the activity is increased or decreased to include the sampled impact for the associated prime risk.

Defining the prime risk collectively over multiple activity-risk pairs is achieved by grouping pairs together for the risk. To group the pairs under a prime risk, the user selects the risk in the Risk Table, which automatically updates the activity table to show the list of associated activities. The user can then select all activities that are to be grouped and press the button to add the group. The example interface shows the activities "Wall, Windows, Doors" and "Roof" have been grouped together for the risk "RSK02—Bad Weather." The prime risk, if sampled as occurring, impacts all member pairs of the group during the realization. The impact can be collectively defined for the entire group using one probability distribution. This is referred to as the Group Impact Distribution. An activity-risk pair can override this impact value with its own probability distribution for the prime risk.

The Risk Register view can also be used to add new prime risks to the project. FIG. 11 shows an example interface for defining a new prime risk. This interface documents the qualitative properties of the prime risk and the quantitative impacts of the prime risks are defined as described earlier using the register view of the Risk Manager. The Risk Definition interface allows the user to define various fields for the prime risk such as name, description, owner, status (In progress, Open, Closed), category type (Threat, Opportunity), strategy type (Accept, Mitigate, Transfer, Avoid, Enhance, Share), probability rating, impact rating, Risk Breakdown Structure (RBS), response and comments. These fields allow modeling to document the various prime risks in the project and update them as changes take place.

Figure 12:
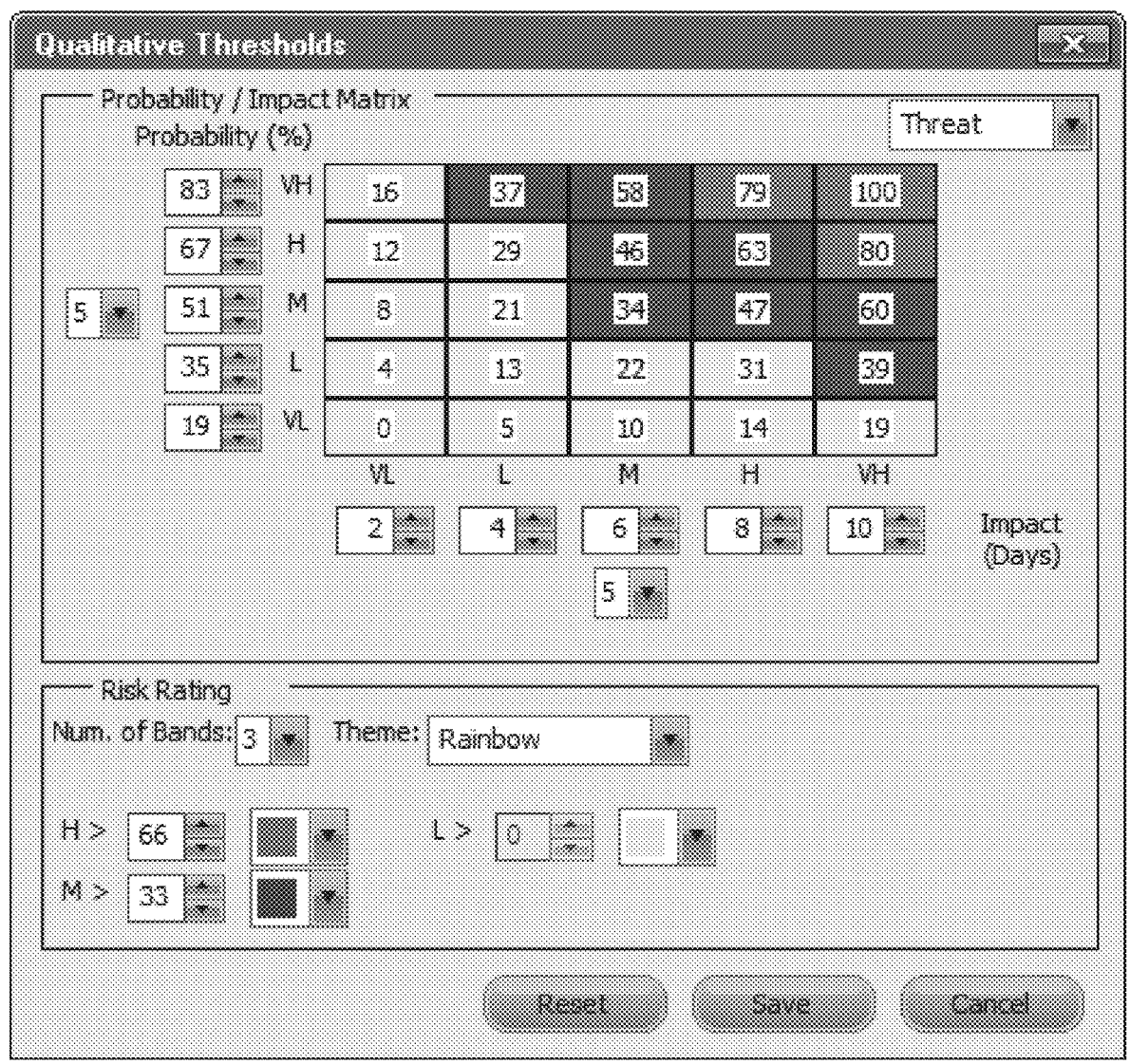
FIG. 12 shows an example interface for defining the Probability Impact matrix.

The probability and impact ratings for risks are defined qualitatively with commonly used identifiers such as Very High, High, Medium, Low or Very Low. The number of identifiers can vary and are defined using a Probability Impact Matrix. FIG. 12 shows an example interface to define the Probability Impact Matrix for the project. The interface is divided into two parts: (i) probability and impact definition, and (ii) threshold definition. The probability and impact definition part allows modeling to define the number of bands for probability and impact ranges. The interface can also be used to control how the qualitative ratings are defined in numerical terms, such as the probability of occurrence and the impact caused. Quantitative ranges defined for the probability and impact ranges are used to compute the corresponding matrix and a set of ratings for each pair of probability and impact bands. These bands can be color coded based on threshold values that can be defined using the interface. The Risk Table in the Risk Register view and the Risk Definition interfaces display the rating of the risk based on the defined probability impact matrix.

FIG. 13 shows another example interface for assigning prime risks to activities. While similar to that in FIG. 10, the interface groups prime risks under activities, which enables the user to assign/un-assign prime risks to a particular activity. The view can be presented with the activities listed in the Activity Table in the top half of the interface. The Risk Table is presented in the bottom half of the interface and, as the user selects an activity in the activity table, the Risk Table is updated to show all assigned and unassigned prime risks for the activity. These two tables may also be combined together within the interface or represented in a different form such as a tree structure to list the information.

In addition to the other options described earlier, the interface also allows assigning prime risk impacts in series or parallel. When prime risks are assigned in parallel, the net impact will be equal to the maximum impact among those prime risks; conversely, when prime risks are assigned in series, the net impact is calculated as the sum or the product of all individual impacts.

Figure 14:
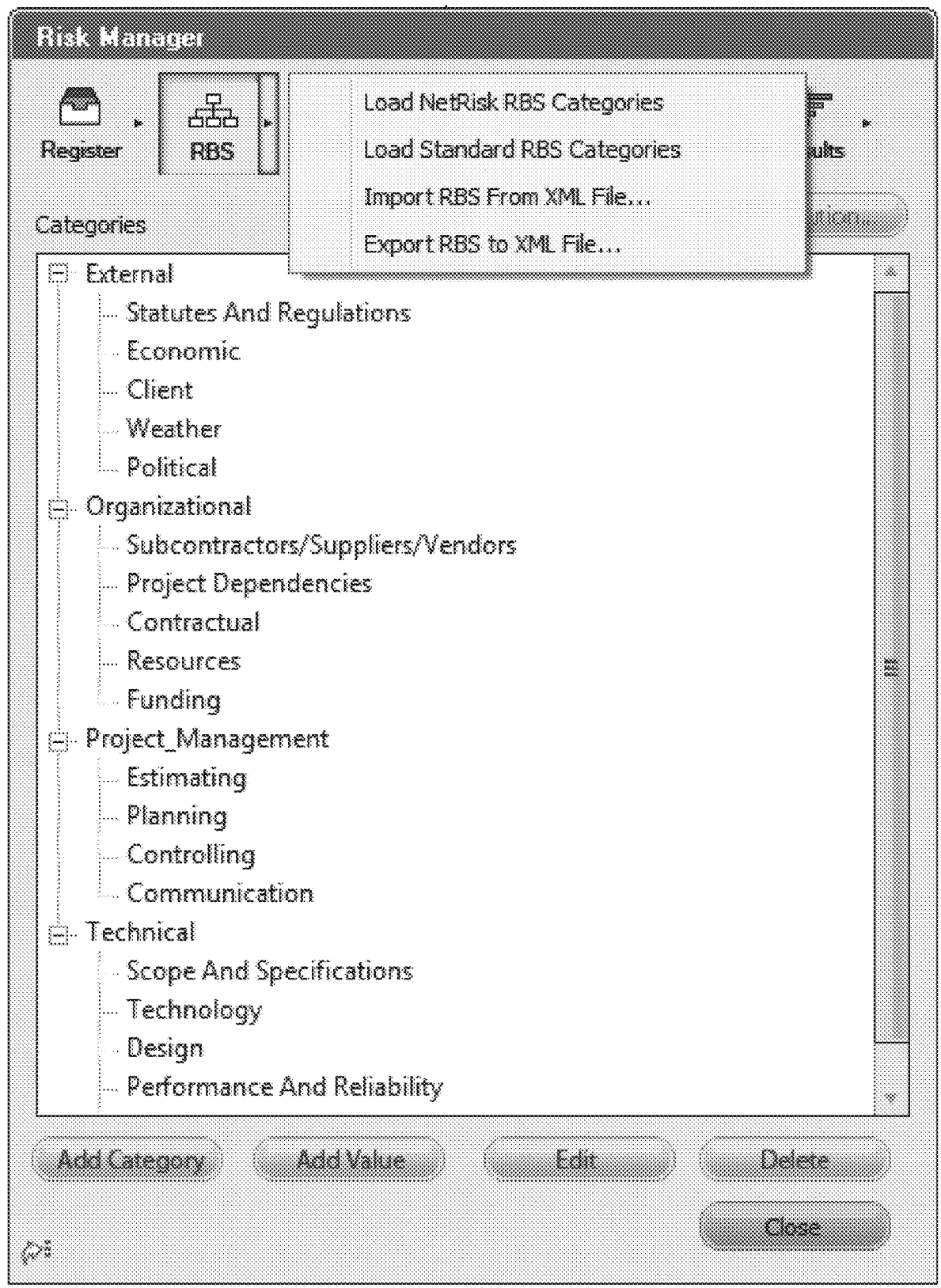
FIG. 14 shows an example interface for defining the Risk Breakdown Structure.

The Risk Breakdown Structure (RBS) is used to hierarchically organize the identified risks. Risks can be assigned to the defined RBS nodes to collect total risk impacts based on RBS values. The RBS can be assigned to a risk using the Risk Definition interface shown in FIG. 11. An RBS structure can be created and/or modified using the example interface shown in FIG. 14. The interface provides the ability to create an RBS structure using default values or import them from a pre-existing file. These methods allow modeling to create a usable RBS structure quickly and to share the same structure over multiple files without having to recreate them each time. The RBS structure can also be imported/exported from/to an XML or other file formats for transferring the structure between several files. The RBS structure is in a tree type display that can be modified as desired. The user can add nodes to the existing structure or categories at any level of the tree, edit node descriptions and also delete a node at any level. When a tree node is deleted, the entire structure below the node is also deleted. If the tree structure cannot be displayed completely within the interface then a horizontal or vertical scrollbar is displayed to allow the user to move the display to see the complete structure.

In the example interface, a probability/impact distribution associated with any RBS node at any level of the RBS structure, unless overridden by the user, serves as default distribution for risk-activity pairs defined under that node. If a risk is assigned to a node for which the default distribution has not been defined, the graphical SRA application looks at its parent node for a default distribution by traversing upwards (towards the root node) until a parent node with a default distribution is encountered or the root node is reached. If no default distribution can be located at a node, no distribution is assigned to the risk-activity pair by default.

During simulation, activity durations and prime risk impacts are modeled using independent and identically distributed (IID) random numbers sampled from defined probability distributions. Often, it is desirable to sample dependent random numbers to model the corresponding dependence in the network. For example, consider a building construction project where the foundation is being excavated in two parts. Assuming that the geology does not vary much between the two areas, if the duration of excavation in the first part is sampled on the high-end of the duration range, it is probable that the duration for the excavation in the second part would also be higher than its estimated duration. In such scenario, the mean impact on the schedule duration may be much higher due to the collective increase of activity durations, than when the activity durations are independently sampled. A method for modeling the dependence among different variables of the logic network provides a powerful technique to more accurately model the realistic scenario.

FIG. 15 shows an example interface to correlate duration/floating/pacing of an activity with the duration/floating/pacing of another activity. The table in the top half shows a list of all activities or those for which the duration/floating/pacing distribution is defined. When an activity is selected, the bottom table is updated to display other activities that are set to be sampled or have a probability distribution defined. The user can then input a value for the desired correlation value in the correlation column within the bottom table.

The interface can be easily extended to provide a single interface for prime risks and activities along with the ability to define correlations between a mix of variables such as impact, risk occurrence, duration, etc. by listing the appropriate variables in the two list boxes. A similar interface may be created using a single table where multiple variables can be selected and the user can specify a common correlation value for all of them.

Figure 16:
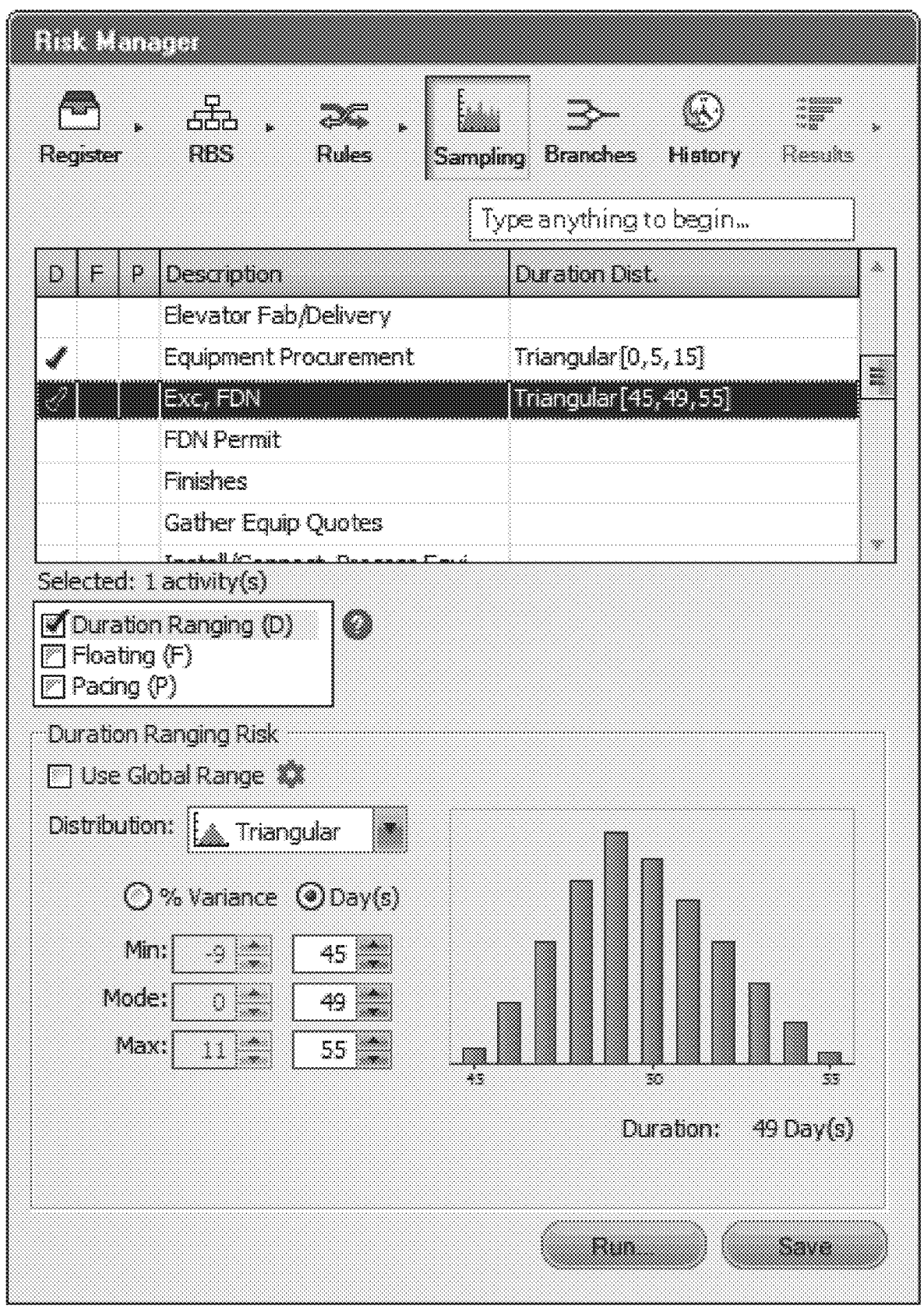
FIG. 16 shows an example Sampling Properties interface used to assist in establishing stochastic distributions and parameter for all activities in the schedule.

FIG. 16 shows an example interface for assigning duration/floating/pacing uncertainties to multiple activities at the same time. The table in the top half lists the available activities in the schedule. When a row is selected, the bottom half of the interface updates to show the current stochastic properties for the selected object. Modeling can specify new properties using the interface to model the desired uncertainty. The example interface for defining the probability distribution or global range is similar to that described earlier. The example interface allows the user to select a row in the table and copy the distribution assignments for the object, which can be pasted to other rows to automatically assign the same distribution(s) to multiple objects.

Figure 17:
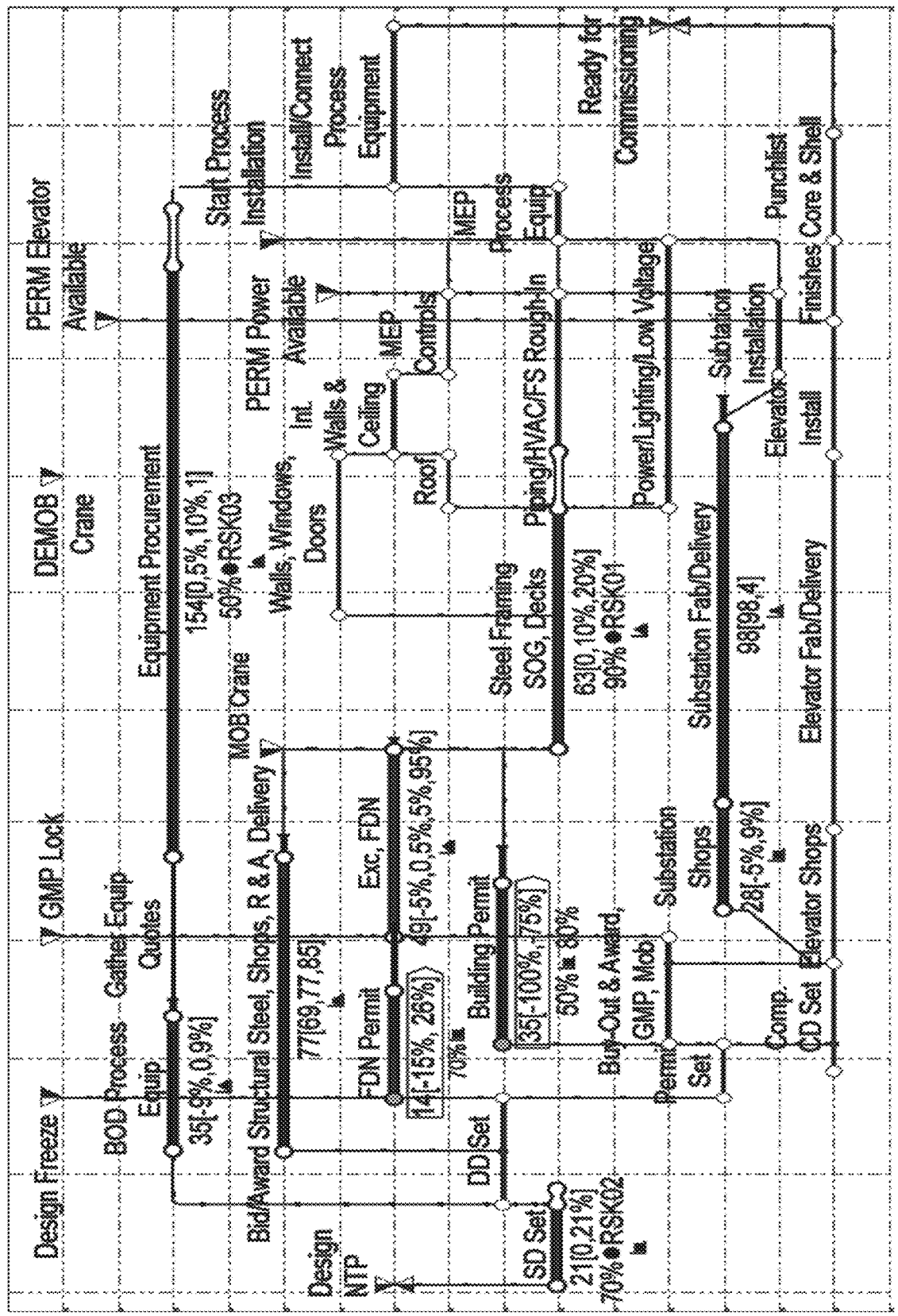
FIG. 17 is an example logic network with risk assignments (risked schedule, simulation model).

FIG. 17 shows an example stochastic model of a logic network that overlaps the display of stochastic properties as defined over the time-scaled display along with the logic network. The duration ranges may be displayed below the activity bar along with the type of the probability distribution. For example, the activity "BOD Process Equip" uses a Triangular distribution with the minimum, mode and maximum values defined as −9%, 0% and 9% of the deterministic duration (35 days), respectively. The probability distribution, if described in terms of absolute number of working days, is displayed similarly. The icon displayed below the activity bar indicates the type of the probability distribution. The variation in duration may also be displayed on the activity bar itself by indicating the minimum, mode and maximum length of the activity overlapping or near the activity bar. For activity "BOD Process Equip," the minimum length is displayed using the green color on the task bar, the orange color indicates the length from minimum to mode, and the black line displays the maximum duration. Floating and pacing information may be displayed on the time-scaled display and is shown in the example risked schedule for activities "FDN Permit" and "Building Permit."

Prime risks assigned to activities are also displayed on the time-scaled display in a similar manner. In addition to the probability distribution for the prime risk displayed below the activity bar, additional information may be displayed such as the risk identifier for the prime risk, the risk rating for the prime risk (textual rating, or color coded) and the probability threshold for the occurrence of the prime risk, as shown for the activity "Equipment Procurement" The impact of the prime risk on the activity "Equipment Procurement" may also be graphically displayed overlapping or near the activity bar in a manner similar to that in the graph.

Figure 18:
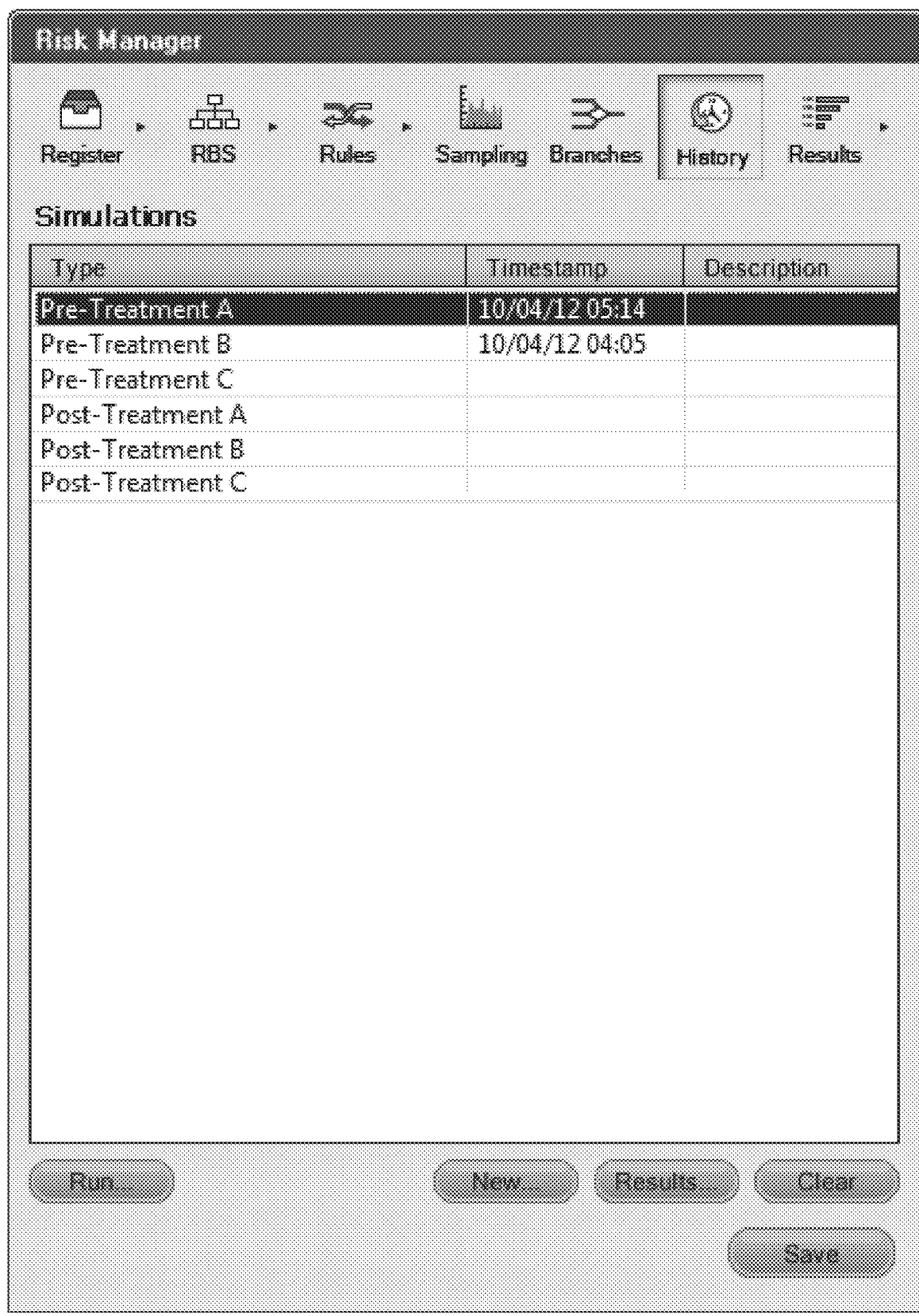
FIG. 18 shows an example interface to display a simulation history for the network.

FIG. 18 shows an example interface to display the simulation history. The interface lists a set of pre-defined simulation types, representing common scenarios. The user may select a pre-defined type from the list or add a new type using the interface. Once a simulation is run for a given type, the timestamp for it is listed in the interface as shown in the figure for types "Pre-treatment A" and "Pre-treatment B." A detailed description can also be specified for each type to identify the significant differences in the simulation model. Multiple simulations could be stored for a given type or the last simulation can overwrite the results from the previous simulation of the same type. To run a particular simulation type, the user must select the type from the list and then press the "Run" button to define/review the simulation parameters and run the simulation.

Figure 19:
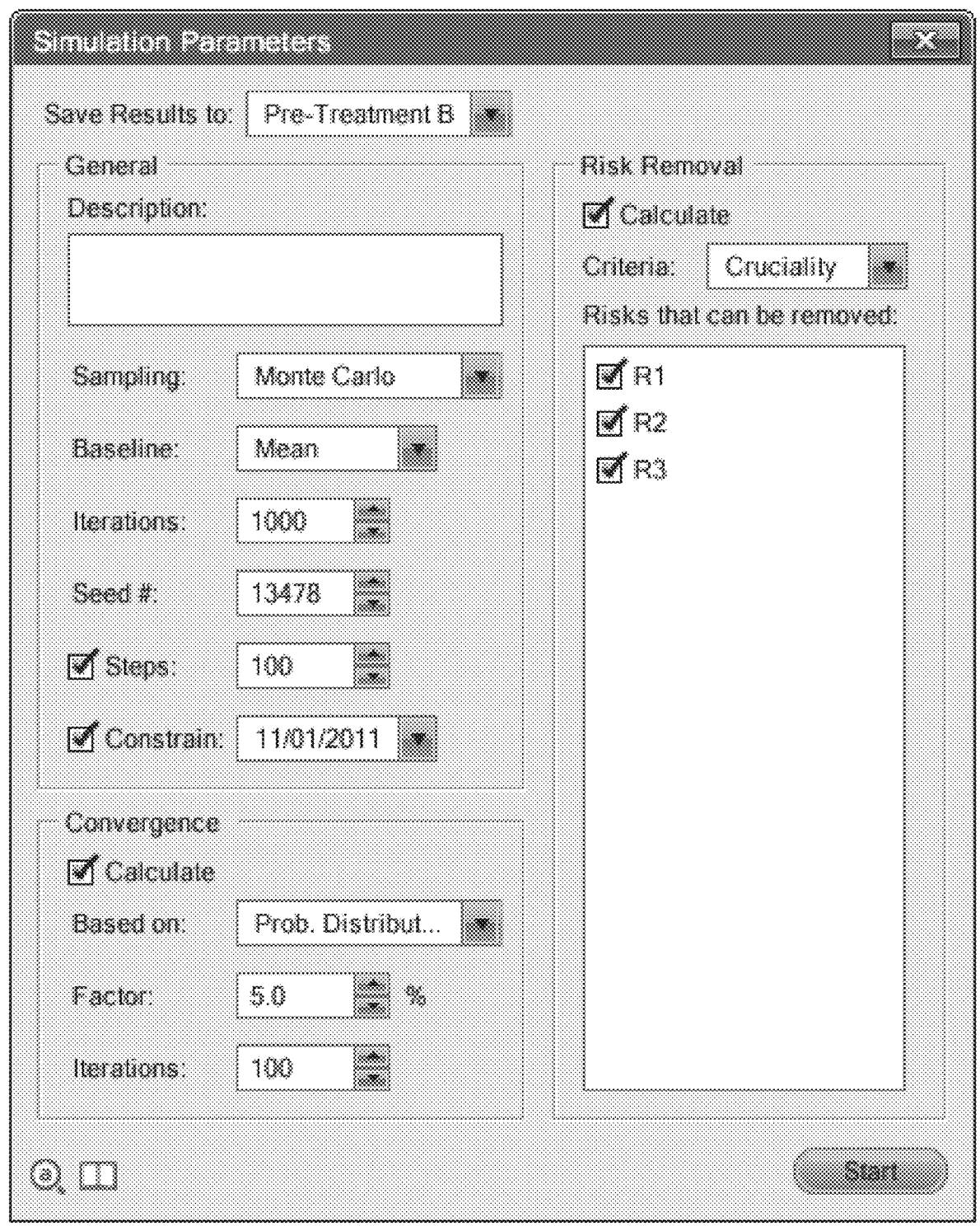
FIG. 19 shows an example interface for defining the parameters and running the simulation.

FIG. 19 shows an example interface to define simulation parameters. At the top, the active simulation for which the parameter definitions will be stored is listed. The left half of the interface lists the common parameters for a simulation study. The interface also displays the simulation type over which the current model has been built upon, if any. For example, the illustrated simulation "Pre-treatment B" has been derived from "Pre-treatment A." The interface may provide several options for algorithms to choose from for running the simulation, such as Monte Carlo, Latin Hypercube, etc.

The example interface also provides a method to define a base-case schedule, which may be established based on deterministic data, mean of stochastic distributions or mode of stochastic distributions. Where a base-case schedule (using activity mean or mode durations and lag mean or mode values) is generated, it is built automatically by the example graphical SRA application and used as the starting point in each realization.

The user may specify the number of realizations for the simulation, as well as interim simulation steps comprising an equal number of realizations for the purpose of ascertaining results as the simulation progresses. The example graphical SRA application can also provide an option to run the simulation until convergence has been reached, in which case, the interface will check for convergence of the simulation results using the defined convergence function. Convergence may be based on overall duration mean, a "p percentile" for the completion distribution or the completion distribution itself. A seed for the simulation may also be provided to gain the capability to recreate the same simulation results. When a seed is provided, the order of the random numbers that are generated is fixed. This not only allows recreating the same results from the simulation but is an important tool in several variance reduction techniques.

Figure 20:
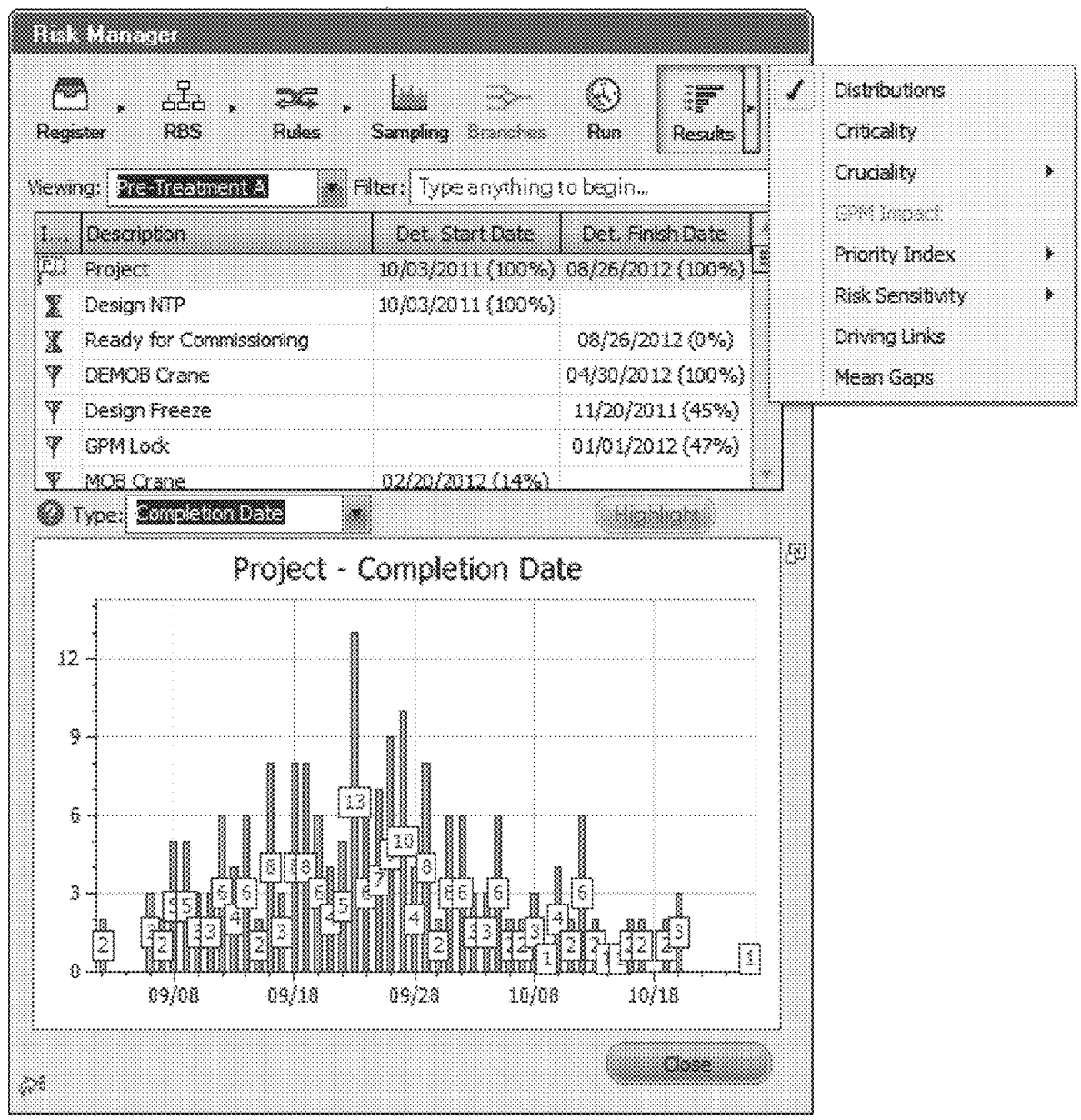
FIG. 20 is an example interface used to display the results of a simulation.

FIG. 20 shows an example interface for summarizing and displaying simulation results. The interface provides a list at the top (within the combo box) to select the current simulation for which the results are displayed. The top half of the interface provides a table listing the relevant objects in the network along with data such as deterministic dates, duration, drift, float, total float and percentile values; minimum, mean, maximum values for dates, duration, drift, float, total float; sampling; floating; pacing; etc. A search box can also be provided to quickly search for objects within the list or filter the list based on certain criteria.

The bottom half of the example interface shows a chart based on the results of the simulation. A variety of charts can be displayed within the interface, such as Distribution graphs for dates, durations, drift, float and total float, Criticality chart, Cruciality Chart, Priority Chart, Driving Links chart.

The example interface can allow adding additional columns to, or removing columns from, the display, customizing columns with values calculated from the other values using a defined formula and expanding the table or chart to use a larger area to display the information. Such an interface can be achieved in any manner, such as resize the interface, left-click, right-click or double-click on the chart or table, left click, right-click or double-click at a predefined location on the interface, including any combination thereof.

Figure 21:
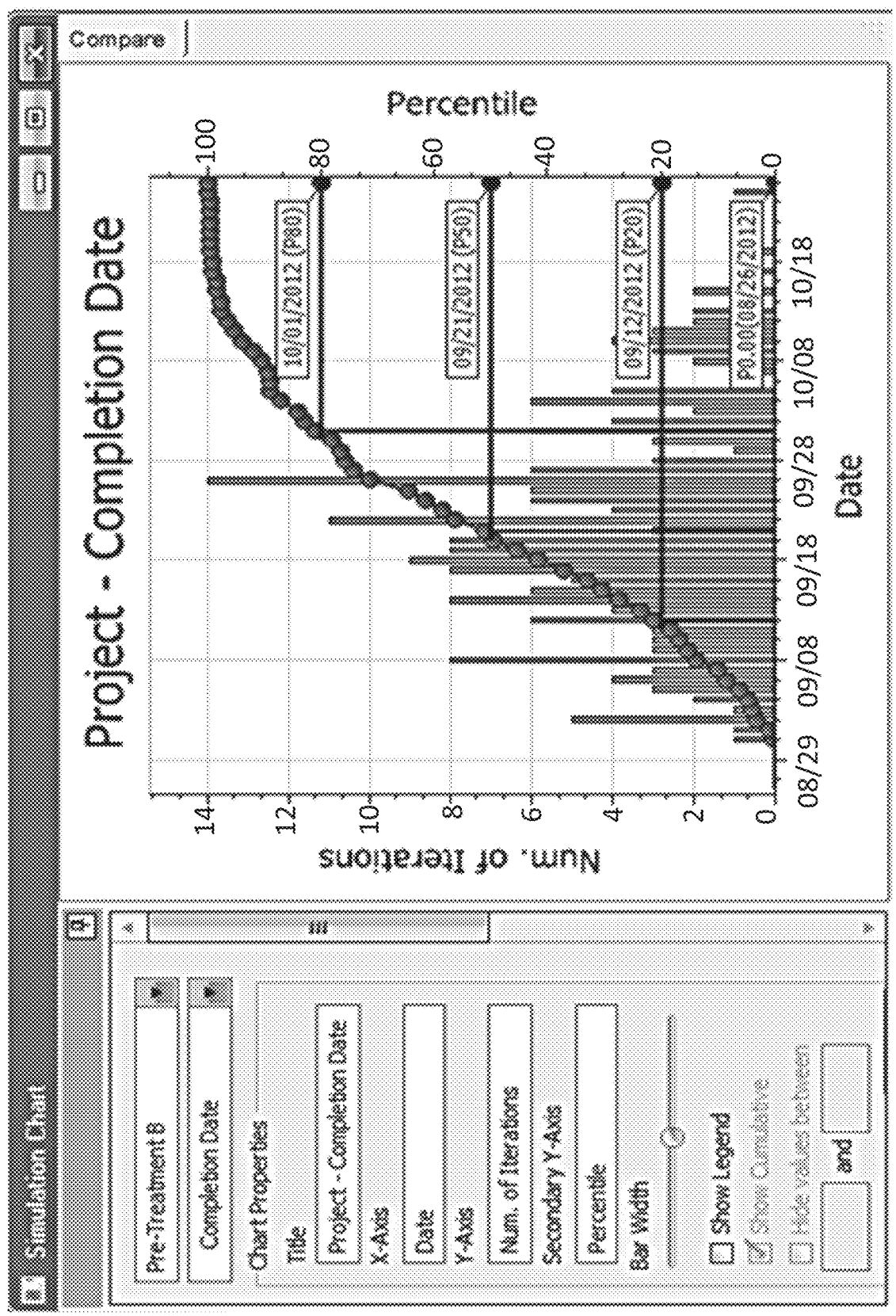
FIG. 21 is an example distribution function for the probability of meeting the completion date.

FIG. 21 shows an example interface of the expanded chart, which may also display additional information not present in the smaller version. The example interface can also provide a method to modify the look of the chart, such as editing the chart title, axis title, display, or hiding the legend, changing colors for the series, etc. The interface can also provide methods to display values for a specific percentile on the chart, as shown in boxes along the X-axis, and the percentile for the deterministic or base-case value, as shown in the box along the Y-axis. The interface can also provide methods to export the data and reconstruct the charts in a different application such as Microsoft Excel (Microsoft Excel is a product of Microsoft Corporation).

Figure 22:
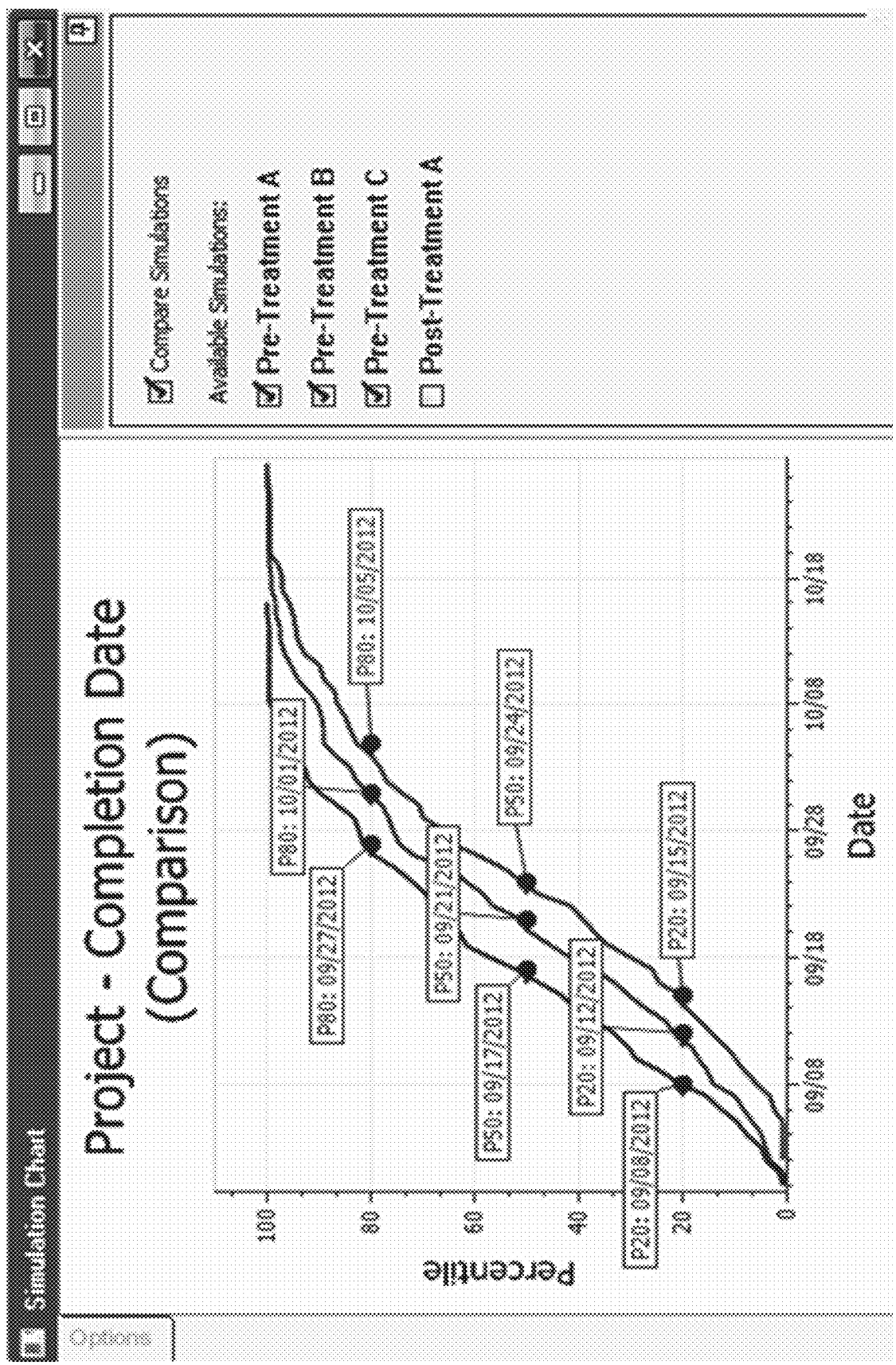
FIG. 22 is an example interface to compare simulation results.

FIG. 22 shows an example interface and chart for comparing simulation results for different scenarios. The options on the right of the interface allow the user to add or remove a data series for a particular simulation from the comparison. The example chart shows a comparison of the distribution of the project completion date for three simulations, namely, Pre-Treatment A, Pre-Treatment B and Pre-Treatment C. On the X-axis, days within the range of the project completion minimum and maximum for the three series are plotted, and the percentile values are plotted on the Y-axis. The comparison allows comparing and ranking the prime risk in each scenario. In this example, the Pre-Treatment A scenario has the highest risk and the scenario for Pre-Treatment C has the lowest schedule risk of the three scenarios. The example chart also indicates the estimated variance at 50th percentile level to be 3 days and at 80th percentile level to be approximately 4 days, between Pre-Treatment A and Pre-Treatment B scenarios.

Figure 23:
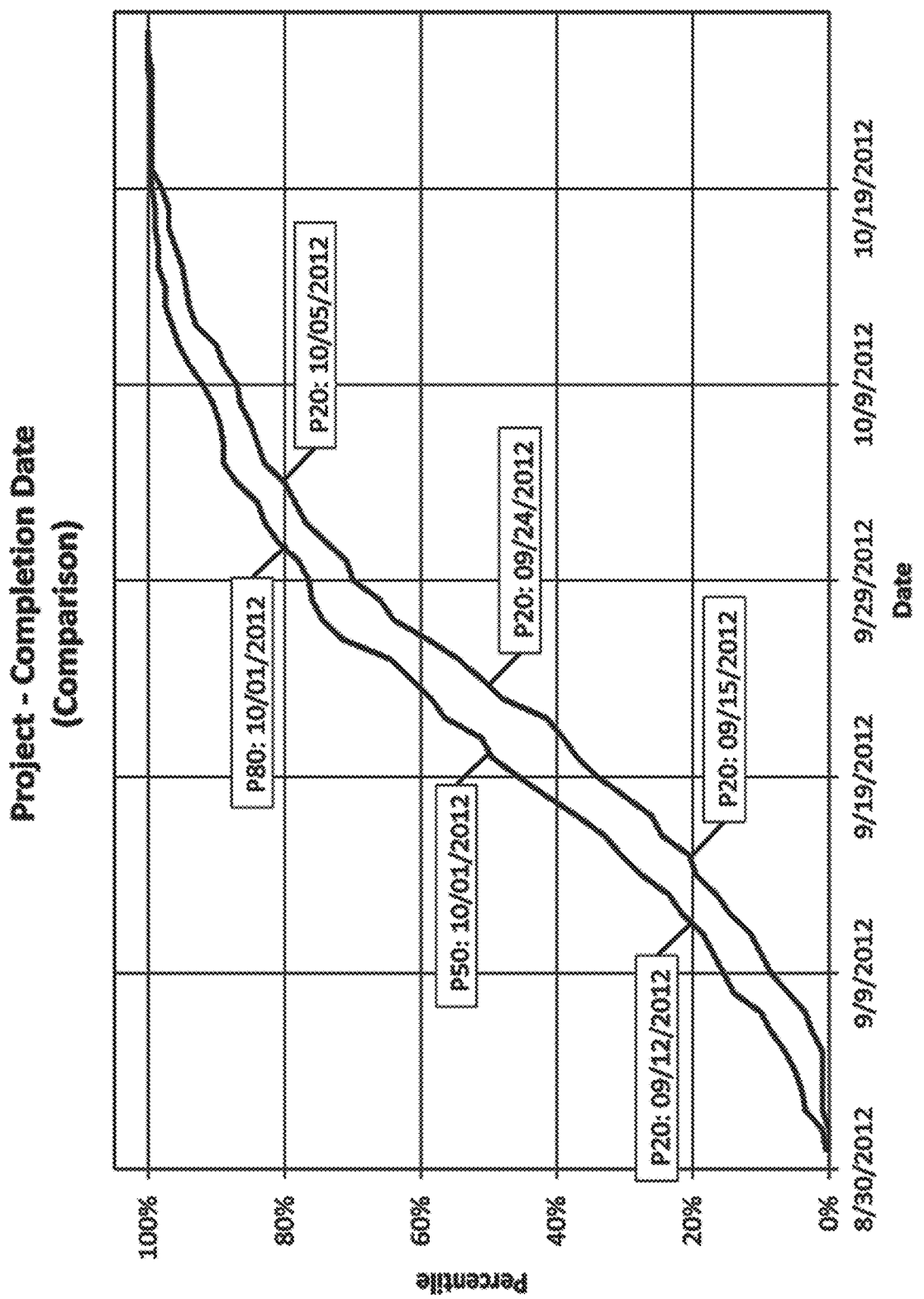
FIG. 23 is an example illustrating simulation results with a planned date and a start-no-earlier (SNE) constraint.

FIG. 23 shows an example interface comparing the distribution of the project completion date for two simulations, one with a conventional SNE constraint and another that replaces the SNE date with a GPM planned date. It can be seen from this example that the planned date yields superior results.

Figure 24:
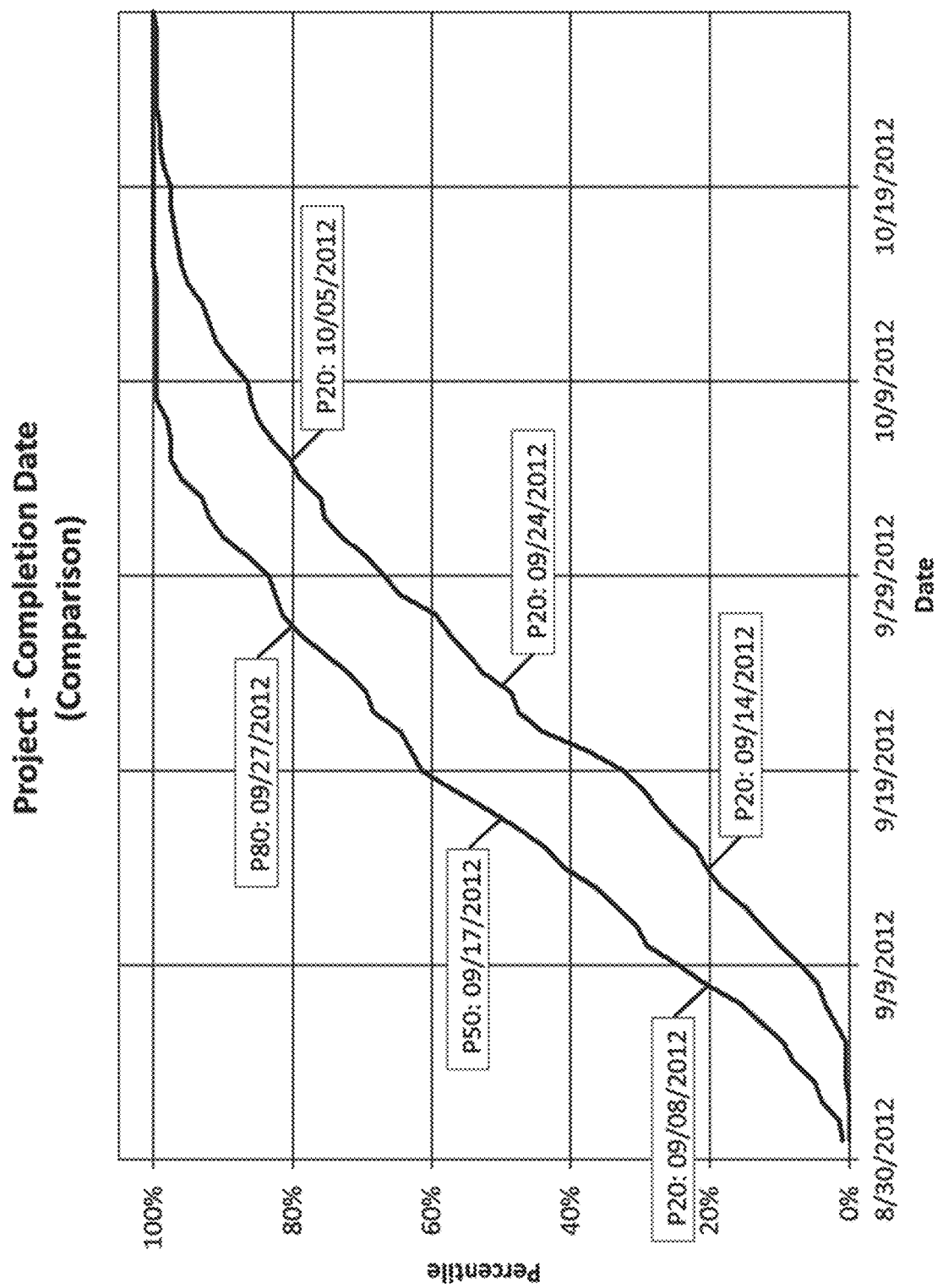
FIG. 24 is an example of the "CPM optimism bias" showing that CPM "p dates" are biased early.

FIG. 24 shows an example interface comparing simulation results for a scenario based on "all CPM early dates" and another where modeling allows for floating and pacing. In this example, the CPM scenario indicates an 80% probability of completion for the Sep. 27, 2012 completion date, which significantly overstates the 57% probability of completion for that date obtained in the GPM scenario. Comparison CPM schedule risk analysis thus overestimates the probability thresholds of meeting milestone dates because, unlike GPM schedule risk analysis, comparison CPM simulation is incapable of modeling floating and/or pacing risks. For example, the percent probability of completion is displayed. In a further example, if the percent probability of completion in the GPM risk schedule analysis is lower than desired, a user can modify the base-case schedule that served as the basis of the simulation, modify probability distributions of the activities, modify constraints or durations or combinations thereof and run the simulation again to increase the percentage to an acceptable level.

Figure 25:
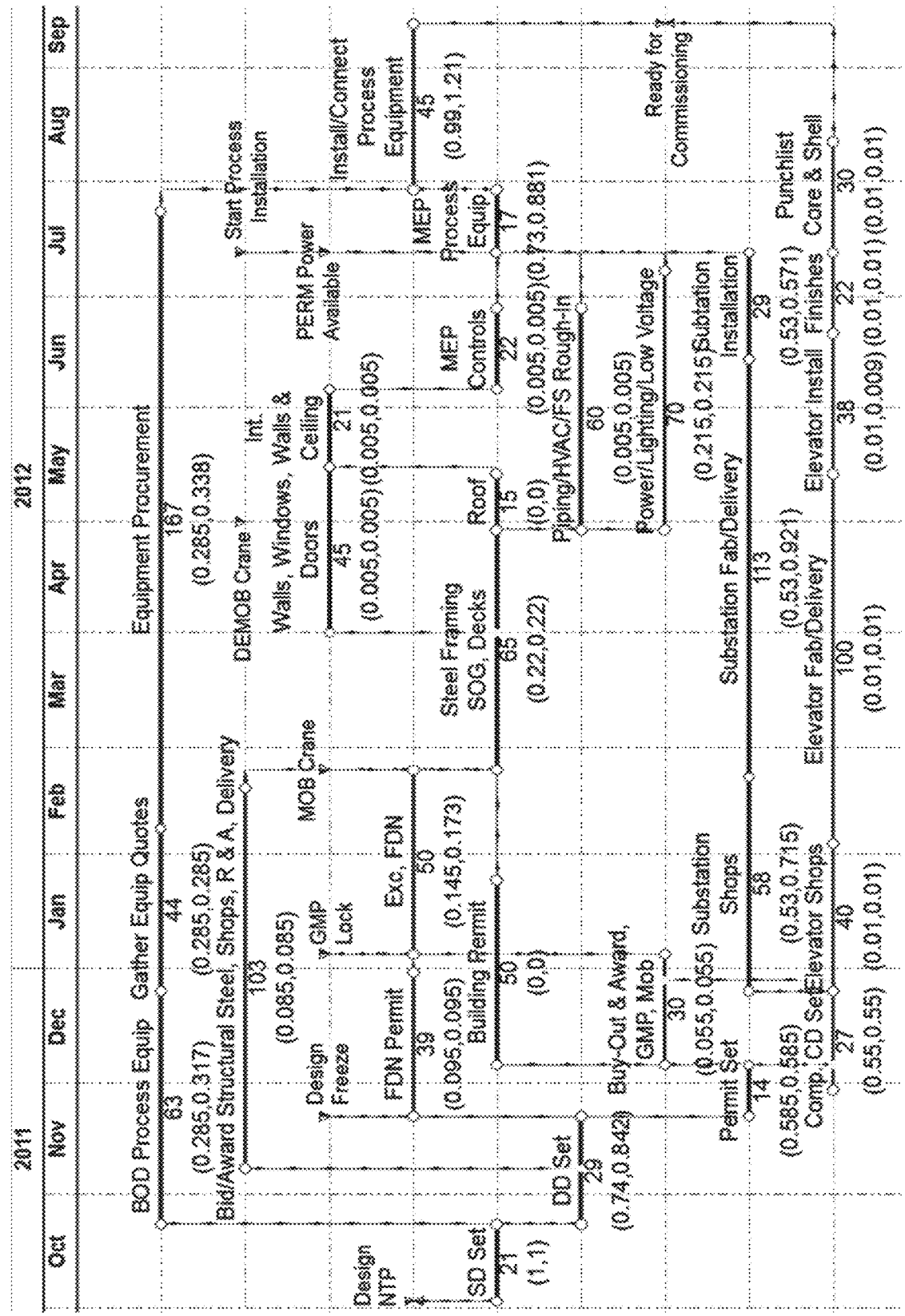
FIG. 25 is an example used to demonstrate criticality indices and priority indices on the time-scaled schedule display.

FIG. 25 shows an example interface and stochastic model of a mean duration scenario of a risk schedule, with criticality indices and priority indices displayed below the activity durations. The sequence step algorithm encodes activities without predecessors as on sequence step 1, and every other activity is on one sequence step higher than the highest sequence step amongst its immediate predecessor activities.

For each activity, the criticality index is a statistical measure of the probability the activity falls on the stochastic longest path. As the example graphical SRA application records, in each realization, the activities that fall on the longest path (the logic chain with the smallest total float value), criticality indices denote the percentage of realizations activities fall on the longest path. Because the example graphical SRA application allows floating and pacing, all activities on the longest path, even if calculated to have positive total float, are recognized as critical. The criticality algorithm commences by identifying the activity with the latest finish date in the realization as critical (that is, falling on the longest path); proceeds to the latest-finish-date activity predecessors and identifies the predecessor (or predecessors) that has/have the smallest total float value as critical; proceeds to the identified smallest-total-float predecessor and identifies its predecessor (or predecessors) that has/have the smallest total float value(s) as critical; and so forth, with the algorithmic operation ending when the activity that starts the schedule and thus without predecessors is reached and identified as critical.

For each activity, cruciality index is a measure of the correlation between the sample/risk-impacted duration to the realized schedule duration. Cruciality ranges from −1 to 1 (as a percentage, from −100% to 100%), it is zero for an activity of certain duration and it is set as zero for an activity with a significance confidence level below a designated percentile. In the example graphical SRA application, results of a significance test, such as a one-tailed or two-tailed test, can also be displayed to indicate the significance or probability of confidence for the correlation value estimated for each activity. Cruciality indices can be based on Pearson's correlation, Spearman's rank order correlation or any other algorithm for computing correlations.

For each activity, the priority index measures the importance of the activity relative to schedule completion risk, and is determined for each activity as criticality index plus the product of criticality index and cruciality index, with the proviso that cruciality index is set to zero, even if calculated as greater than zero, if the significance probability of confidence is less than the designated percentile. In the example in FIG. 25, priority indices are based on a significance confidence level above 66% (2:1 confidence level).

In further examples, the application may support the import of information to build the stochastic model of the network, such as the logic network, RBS structure, risk register, risk assignments, duration/floating/pacing uncertainty definition, etc. The information can be provided using a spreadsheet tool such as Microsoft Excel, or a comma-separated file, or any other computer readable format.

In further examples, the application can support the export of the stochastic model into a pre-defined file format for documentation purposes or building a model in another application. Such examples can also provide methods to export the results of the simulation directly to another application or to a file with a pre-defined format to create reports from an automated analysis of the simulation results.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A computer-implemented simulation method for analyzing schedule risk in a graphical schedule, the method comprising:
   (a) providing a base schedule that has graphical schedule objects including activities that are connected in a logic network by logic ties, the schedule culminating in a completion milestone;
   simulating a rescheduling of the base schedule, activity-by-activity, according to the logic network by:
   (b) sampling from probability distributions representing uncertainties in the durations of the activities to simulate activity durations from start dates to finish dates, and identifying activities that are eligible for floating, wherein activities are eligible for floating based on random sampling and decision rules that model uncertainty in floating risk of the activity;
   (c) selecting a consumption value from a plurality of float consumption values based upon a probability distribution representing probabilities of the plurality of consumption values;
   (d) floating the start date of an eligible one of the activities by delaying the start date by the selected consumption value of its float then existing in the simulating of the rescheduling; and
   (e) using the logic ties, the sampled activity durations, and the delayed start date to determine an output representing a simulated occurrence of the base schedule culminating in the completion milestone.

2. The method as recited in claim 1, wherein the sampling of one of the activity durations of an earlier one of the activities than the activity of said step (c) impacts the float of the activity of said step (c) to produce an impacted float, and the function of said step (c) includes a ratio between the impacted float, then existing when the activity is rescheduled, and the float of the activity in the base schedule.

3. The method as recited in claim 2, including, when the activity is rescheduled in the simulated occurrence, delaying the start date of the activity of said step (c) in response to the ratio exceeding a designated threshold.

4. The method as recited in claim 3, including repeating a number of iterations of said step (b) and, for at most all of the iterations of said step (b), repeating the floating of said step (c).

5. The method as recited in claim 1, including repeating a number of iterations of said step (b) and, for at most than all of the iterations of said step (b), repeating the floating of said step (c).

6. The method as recited in claim 5, including repeating the floating of said step (c) as a function of a likelihood factor representing a percentage of the number of iterations of said step (b) in which the floating of said step (c) is repeated.

7. The method as recited in claim 1, further comprising defining a default probability distribution for fewer than all the graphical schedule objects.

8. The method as recited in claim 1, including repeating a number of iterations of said step (b) and the floating of said step (c), on the base schedule and determining a longest path in each iteration by applying a criticality algorithm that is operable to identify a critical path with embedded drift and positive total float by working through the network, according to how the activities are connected, in reverse logical order.

9. The method as recited in claim 1, further comprising determining whether a start-no-earlier constraint or a planned date is to be applied to any one of the start dates, wherein the start date is a corresponding earliest start date in the base schedule in response to non-application of the constraint, the start date is a date different than the earliest start date in the base schedule, but not earlier than the constraint date, in response to application of the constraint and the start date is a date different than the earliest start date in the base schedule, and, in every instance in which said step (c) is repeated, earlier or later than the planned date in response to the application of the planned date.

10. The method as recited in claim 9, including repeating a number of iterations of said step (b), including repeating the floating of said step (c) on the base schedule and determining a longest path in each iteration by applying a criticality algorithm that is operable to identify a critical path with embedded drift and positive total float by working through the network, according to how the activities are connected, in reverse logical order.

11. The method as recited in claim 1, wherein the base schedule is bifurcated through one of the activities with respect to a current data date between a progressed schedule portion and a forecast schedule portion, and an uncertainty of a remaining portion of the activity is proportional to an uncertainty of the whole activity.

12. The method as recited in claim 1, wherein the base schedule is bifurcated through one of the activities with respect to a current data date between a progressed schedule portion and a forecast schedule portion, and modifying the probability distribution of the activity in response to a remaining portion of the activity exceeding the minimum activity duration of the probability distribution.

13. The method as recited in claim 1, wherein the activities must occur in logical order for the schedule to culminate in the milestone, and further comprising additionally using a delay object to determine the output, the delay object representing an activity in the base schedule that is uncertain to occur and is not required for the base schedule to culminate in the milestone.

14. The method as recited in claim 13, including repeating a number of iterations of said steps (a), (b), (c) (d), and (e), and using the delay object for at most all of the iterations.

15. The method as recited in claim 1, further comprising assigning a prime risk to fewer than all of the activities, wherein the prime risk has an individual probability of occurrence and individual impact on the activity durations, and, when the prime risk occurs according to the individual probability, modifying the activity durations of the activities that are assigned the prime risk, while the activity durations of other of the activities that are not assigned the prime risk are not modified by the prime risk or individual probability.

16. The method as recited in claim 15, further comprising assigning another prime risk to at least one of the other of the activities and that has a different individual probability of occurrence and individual impact on the activity durations.

17. The method as recited in claim 1, further comprising defining a correlation value between two of the activities such that the probability distribution of one of the two activities is defined as a function of the probability distribution of the other of the two activities.

18. The method as recited in claim 1, including determining the output representing the probability of completing the base schedule from a number of iterations of said step (b), including repeating the floating of said step (c) for at most all of the iterations, wherein each iteration starts with the base schedule and, in each iteration, the simulated occurrence of the base schedule is progressively developed by modifying the base schedule, one activity at a time, according to how the activities are connected in the logic network.

19. The method as recited in claim 1, including determining a criticality index and a priority index of one or more of the activities, the criticality index representing a probability that the one or more activities are on a stochastic longest path in the simulation, and the priority index representing the criticality index plus the criticality index times a factor that measures the correlation between sampled activity duration of one or more of the activities and the realized schedule duration.

20. The method as recited in claim 1, in which said step (e) is repeated, further comprising, in response to sampling and risk impacting the activity duration of each respective one of the activities and modifying the start date by selecting a float consumption value, crashing the activity to a shorter duration or extending the activity to a longer duration, and updating at least one of the lags, gaps, start dates, finish dates, drifts, floats and total floats of predecessor and successor activities that are directly or indirectly connected in the logic network by the logic ties to the respective one of the activities, and repeating the crashing or extending for each activity in the logic network, one at a time, according to how the activities are connected in the logic network, until all the activities are scheduled, resulting in a simulated occurrence of the base schedule culminating in the completion milestone.

21. The method as recited in claim 1, wherein the activity of said step (b) is connected in the logic network by one of the logic ties to another activity based on a lag value, the lag value denoting the minimum interval of time between the connected dates of the two logically-tied activities, and said step (b) further comprises sampling from probability distributions representing uncertainty in the lag value to simulate a sampled lag value.

22. The method as recited in claim 21, wherein said step (c) further comprises using the sampled lag value to additionally determine the output.

23. The method as recited in claim 1, wherein the random sampling and decision rules model a random delay to the start of the activity, and the delaying of the start date is independent of schedule progress and pushes the completion milestone to a later date.

24. The method as recited in claim 1, wherein said step (b) further comprises modeling uncertainty in pacing risk of the activity using a random delay to the start date of the activity, wherein the delaying is dependent on schedule progress, results in excess total float for the activity in the simulated occurrence, and pushes the completion milestone to a later date.

25. The method as recited in claim 1, including modifying, in logical order with respect to the logic network, each of the activities by replacing a respective base duration of each of the activities with a sampled duration and shifting each of the activities, if simulated as floating or pacing, to shift to a late date and, at each modification of replacing the respective base duration with the sampled duration, recalculating lags, gaps, dates, drifts, floats, and total floats for predecessor and successor activities that are affected by the modification.

26. A computer program, comprising software encoded in non-transitory computer-readable media, for analyzing risk in a graphical schedule, the software comprising instructions, operable when executed, to:
  (a) providing a base schedule that has graphical schedule objects including activities that are connected in a logic network by logic ties, the activities culminating in a completion milestone;
  simulating a rescheduling of the base schedule, activity-by-activity, according to the logic network by:
  (b) sampling from probability distributions representing uncertainties in the durations of the activities to simulate activity durations from start dates to finish dates, and identifying activities that are eligible for floating, wherein activities are eligible for floating based on random sampling and decision rules that model uncertainty in floating risk of the activity
  (c) selecting a consumption value from a plurality of float consumption values based upon a probability distribution representing probabilities of the plurality of consumption values;
  (d) floating the start date of an eligible one of the activities by delaying the start date by the selected consumption value of its float then existing; and
  (e) using the logic ties, the sampled activity durations, and the delayed start date to determine an output representing a simulated of occurrence of the base schedule culminating in the completion milestone.

27. A system for analyzing risk in a graphical schedule, the system comprising:
  a user interface; and
  at least one processor configured to:
  (a) provide a base schedule that has graphical schedule objects including activities that are connected in a logic network by logic ties, the activities culminating in a completion milestone;
  simulate a rescheduling of the base schedule, activity-by-activity, according to the logic network by the following:
  (b) sample from probability distributions representing uncertainties in the durations of the activities to simulate activity durations from start dates to finish dates, and identify activities that are eligible for floating, wherein activities are eligible for floating based on random sampling and decision rules that model uncertainty in floating risk of the activity;
  (c) select a consumption value from a plurality of float consumption values based upon a probability distribution representing probabilities of the plurality of consumption values;
  (d) float the start date of an eligible one of the activities by delaying the start date by the selected consumption value of its float then existing; and
  (e) use the logic ties, the sampled activity durations, and the delayed start date to determine an output representing a simulated occurrence of the base schedule culminating in the completion milestone.

\* \* \* \* \*